US012183258B2

(12) United States Patent
Kim et al.

(10) Patent No.: US 12,183,258 B2
(45) Date of Patent: Dec. 31, 2024

(54) DISPLAY DEVICE AND METHOD OF DRIVING DISPLAY DEVICE

(71) Applicant: Samsung Display Co., Ltd., Yongin-Si (KR)

(72) Inventors: Subin Kim, Suwon-si (KR); Se-Byung Chae, Seongnam-si (KR); Hyunchang Kim, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 155 days.

(21) Appl. No.: 17/869,200

(22) Filed: Jul. 20, 2022

(65) Prior Publication Data

US 2023/0133606 A1 May 4, 2023

(30) Foreign Application Priority Data

Nov. 1, 2021 (KR) ........................ 10-2021-0147763

(51) Int. Cl.
*G09G 3/20* (2006.01)
*G09G 3/00* (2006.01)
(Continued)

(52) U.S. Cl.
CPC ........... *G09G 3/2096* (2013.01); *G09G 3/006* (2013.01); *G09G 3/3266* (2013.01);
(Continued)

(58) Field of Classification Search
CPC .... G09G 3/2096; G09G 3/2092; G09G 3/006; G09G 3/3266; G09G 3/3275;
(Continued)

(56) References Cited

U.S. PATENT DOCUMENTS 8,593,388 B2 11/2013 Kim et al.
9,111,509 B2 8/2015 Kim et al.
(Continued)

FOREIGN PATENT DOCUMENTS

KR 10-2007-0080929 A 8/2007
KR 10-1329706 B1 11/2013
(Continued)

*Primary Examiner* — William Boddie
*Assistant Examiner* — Saifeldin E Elnafia
(74) *Attorney, Agent, or Firm* — Innovation Counsel LLP

(57) ABSTRACT

Disclosed is a display device, which includes a display panel, a controller that receives an image signal and an external synchronization signal and generates a control signal, and a driver that generates a driving signal in response the control signal and provides the driving signal to the display panel. The controller includes a synchronization signal generator that generates an internal synchronization signal based on a reference clock signal, a corrector that corrects the internal synchronization signal to generate a corrected synchronization signal, and a control signal generator that generates the control signal, and the control signal generator generates the control signal based on the external synchronization signal when the external synchronization signal is in a normal state, and generates the control signal based on the internal synchronization signal when the external synchronization signal is in an abnormal state.

19 Claims, 16 Drawing Sheets

(51) Int. Cl.
*G09G 3/3266* (2016.01)
*G09G 3/3275* (2016.01)

(52) U.S. Cl.
CPC ......... *G09G 3/3275* (2013.01); *G09G 3/2092* (2013.01); *G09G 2300/0819* (2013.01); *G09G 2300/0861* (2013.01); *G09G 2310/06* (2013.01); *G09G 2310/061* (2013.01); *G09G 2310/08* (2013.01); *G09G 2330/021* (2013.01); *G09G 2330/022* (2013.01); *G09G 2330/028* (2013.01); *G09G 2330/12* (2013.01)

(58) Field of Classification Search
CPC ... G09G 2300/0819; G09G 2300/0861; G09G 2310/06; G09G 2310/061; G09G 2310/08; G09G 2330/021; G09G 2330/022; G09G 2330/028; G09G 2330/12
See application file for complete search history.

(56) References Cited

U.S. PATENT DOCUMENTS

| | | | | |
|---|---|---|---|---|
| 2007/0164969 | A1* | 7/2007 | Kim | G09G 3/3611 345/99 |
| 2013/0038597 | A1* | 2/2013 | Kim | G09G 3/3688 345/204 |
| 2013/0057763 | A1* | 3/2013 | Cha | G09G 5/12 348/554 |
| 2013/0300313 | A1* | 11/2013 | Yamazaki | H10K 59/35 313/504 |
| 2015/0077424 | A1* | 3/2015 | Zhao | G09G 5/12 345/531 |
| 2015/0243203 | A1 | 8/2015 | Kim et al. | |

FOREIGN PATENT DOCUMENTS

| | | |
|---|---|---|
| KR | 10-1839328 B1 | 4/2018 |
| KR | 10-1962860 B1 | 3/2019 |

* cited by examiner

DISPLAY DEVICE AND METHOD OF DRIVING DISPLAY DEVICE

CROSS-REFERENCE TO RELATED APPLICATIONS

This application claims priority under 35 U.S.C. § 119 to Korean Patent Application No. 10-2021-0147763 filed on Nov. 1, 2021, in the Korean Intellectual Property Office, the disclosures of which are incorporated by reference herein in their entireties.

BACKGROUND

Embodiments of the present disclosure described herein relate to a display device and a method of driving the display device, and more particularly, relate to a display device and a method of driving the display device for improving reliability of display quality.

Various display devices that are used in a multi-media device such as a television, a mobile phone, a tablet computer, a navigation system, or a game console are being developed.

As these display devices are used in various field, the types of display panels for displaying an image are being diversified too.

Nowadays, a display panel includes a light emitting display panel and the light emitting display panel may include an organic light emitting display panel or a quantum dot light emitting display panel.

SUMMARY

Embodiments of the present disclosure provide a display device capable of ensuring reliability of display quality of a display panel regardless of whether a synchronization signal provided from an external device to the display device is in a normal state.

According to an embodiment of the present disclosure, a display device includes a display panel displaying an image, a controller receiving an image signal and an external synchronization signal, and generating a control signal, a driver generating a driving signal in response the control signal and providing the driving signal to the display panel, 1. The controller includes a synchronization signal generator that generates an internal synchronization signal based on a reference clock signal, a corrector that corrects the internal synchronization signal to generate a corrected synchronization signal, and a control signal generator that generates the control signal. The control signal generator generates the control signal based on the external synchronization signal when the external synchronization signal is in a normal state. The control signal generator generates the control signal based on the internal synchronization signal when the external synchronization signal is in an abnormal state.

According to an embodiment, the controller may further include a synchronization determination circuit that determines whether the external synchronization signal is synchronized with the corrected synchronization signal. The control signal generator may generate the control signal based on the corrected synchronization signal when the external synchronization signal is not synchronized with the corrected synchronization signal.

According to an embodiment, the synchronization determination circuit may generate a timing signal when the external synchronization signal is synchronized with the corrected synchronization signal. The control signal generator may generate the control signal based on the external synchronization signal when the timing signal is received.

According to an embodiment, the synchronization determination circuit may receive a preset allowable value. The synchronization determination circuit may generate the timing signal when a difference between a start time of an active section of the external synchronization signal and a start time of an active section of the corrected synchronization signal is less than the preset allowable value.

According to an embodiment, the internal synchronization signal may include a vertical synchronization signal and a horizontal synchronization signal. The corrected synchronization signal may be a signal generated by correcting the horizontal synchronization signal. The controller may further include a state determination circuit that generates a state signal for controlling an operation of the control signal generator based on the timing signal and the vertical synchronization signal.

According to an embodiment, the vertical synchronization signal may include information on a display section in which the image is displayed on the display panel and a blank section in which the image is not displayed on the display panel. The state determination circuit may generate the state signal when the external synchronization signal is synchronized with the corrected synchronization signal, and when information from the vertical synchronization signal is in the blank section.

According to an embodiment, one period of the corrected synchronization signal may be different from one period of the internal synchronization signal.

According to an embodiment, one period of the corrected synchronization signal may be greater than one period of the internal synchronization signal.

According to an embodiment, a first period of the corrected synchronization signal may be less than a second period that is a subsequent period of the first period of the corrected synchronization signal.

According to an embodiment, the controller may further include an error determination circuit that determines whether the external synchronization signal is in an abnormal state. The error determination circuit may provide an error detection signal to the control signal generator when it is determined that the external synchronization signal is in the abnormal state. The control signal generator may generate the control signal based on the internal synchronization signal when the error detection signal is received.

According to an embodiment, the error determination circuit may generate an error end signal when the external synchronization signal is restored from the abnormal state to a normal state, and may provide the error end signal to the corrector. The corrector may generate the corrected synchronization signal by correcting the internal synchronization signal when the error end signal is received.

According to an embodiment, the error determination circuit may generate the error detection signal when the external synchronization signal is in the abnormal state and a first period of the external synchronization signal is different from a second period of the external synchronization signal that is a subsequent to the first period.

According to an embodiment, the error determination circuit may generate the error end signal when the external synchronization signal is restored from the abnormal state to the normal state and a third period of the external synchronization signal that is a subsequent to the second period of the external synchronization signal is the same as the first period.

According to an embodiment, the controller may further include an oscillator that generates an oscillation signal having a predetermined frequency. The synchronization signal generator may generate the internal synchronization signal based on the reference clock signal and the oscillation signal.

According to an embodiment, the driver may include a source driver that receives the image data from the controller and provides a data signal for displaying the image on the display panel, and a gate driver that provides a scan signal to the display panel. The control signal may include a first control signal for controlling the source driver and a second control signal for controlling the gate driver.

According to an embodiment of the present disclosure, a display device includes a display panel displaying an image, a controller receiving an image signal and generating a control signal, and a driver generating a driving signal in response the control signal and provide the driving signal to the display panel. A method of driving the display device includes determining whether an external synchronization signal provided to the controller is in a normal state, and generating the control signal based on an internal synchronization signal generated based on a reference clock signal when it is determined that the external synchronization signal is in an abnormal state. The method of driving the display device includes generating a corrected synchronization signal by correcting the internal synchronization signal when the external synchronization signal is restored from the abnormal state to the normal state, and determining whether the corrected synchronization signal is synchronized with the external synchronization signal. The method of driving the display device includes generating the control signal based on the external synchronization signal when the corrected synchronization signal is synchronized with the external synchronization signal.

According to an embodiment, the method of driving the display device may further include generating the control signal based on the corrected synchronization signal when the corrected synchronization signal is not synchronized with the external synchronization signal.

According to an embodiment, the method of driving the display device may further include generating the control signal based on the external synchronization signal when it is determined that the external synchronization signal is in the normal state.

According to an embodiment, the method of driving the display device may further include determining whether a timing at which the corrected synchronization signal is synchronized with the external synchronization signal is included in the blank section during which the image is not displayed on the display panel.

According to an embodiment, the method of driving the display device may further include generating the control signal based on the external synchronization signal when the synchronized timing is included in the blank section.

According to an embodiment, the method of driving the display device may further include generating the control signal based on the external synchronization signal from a start time of the blank section when the synchronized timing is not included in the blank section.

BRIEF DESCRIPTION OF THE FIGURES

The above and other objects and features of the present disclosure will become apparent by describing in detail embodiments thereof with reference to the accompanying drawings.

FIGS. 9A, 9B, 9C and 10B are waveform diagrams for describing an operation of a signal converter, according to an embodiment of the present disclosure.

DETAILED DESCRIPTION

Figure 1:
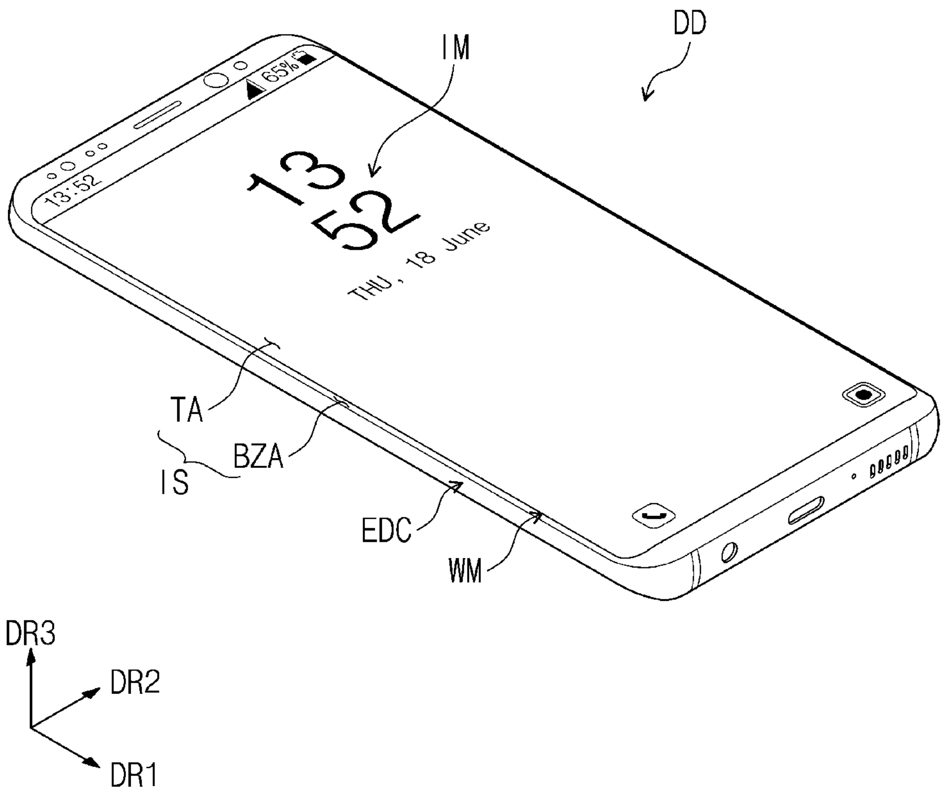
FIG. 1 is a perspective view illustrating a display device according to an embodiment of the present disclosure.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. Also, in drawings, the thickness, ratio, and dimension of components are exaggerated for effectiveness of description of technical contents. The term "and/or" includes one or more combinations of the associated listed items.

The terms "first", "second", etc. are used to describe various components, but the components are not limited by the terms. The terms are used only to differentiate one component from another component. For example, a first component may be named as a second component, and vice versa, without departing from the spirit or scope of the present disclosure. A singular form, unless otherwise stated, includes a plural form.

Also, the terms "under", "beneath", "on", "above" are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless defined otherwise, all terms (including technical and scientific terms) used herein have the same meaning as commonly understood by one of ordinary skill in the art to which this disclosure belongs. In addition, terms such as terms defined in commonly used dictionaries should be interpreted as having a meaning consistent with the meaning in the context of the related technology, and should not be interpreted as an ideal or excessively formal meaning unless explicitly defined in the present disclosure.

Hereinafter, embodiments of the present disclosure will be described with reference to accompanying drawings.

Figure 2:
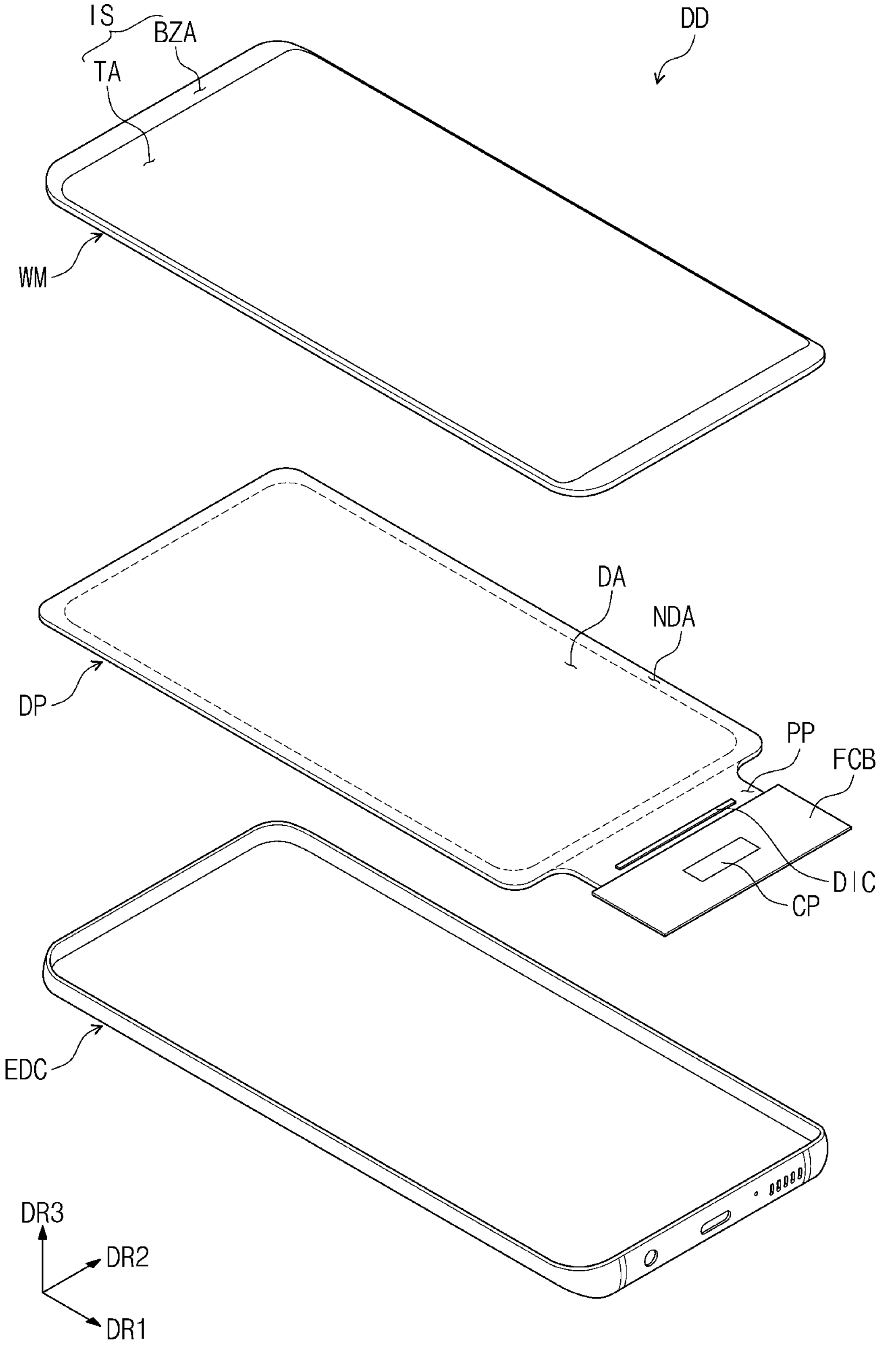
FIG. 2 is an exploded perspective view of a display device, according to an embodiment of the present disclosure.

FIG. 1 is a perspective view of a display device according to an embodiment of the present disclosure. FIG. 2 is an exploded perspective view of a display device according to an embodiment of the present disclosure.

Referring to FIG. 1, a display device DD may be a device activated in response to an electrical signal. FIGS. 1 and 2 illustrate that the display device DD is a smartphone. However, the present disclosure is not limited thereto. For example, as well as a large-sized display device, such as a television, a monitor, or the like, the display device DD may be a small and medium-sized display device, such as a tablet PC, a notebook computer, a vehicle navigation system, a game console, or the like.

The above examples are provided only as an embodiment, and it is obvious that the display device DD may be implemented as another type of display device without departing from the concept of the present disclosure.

The display device DD has a long side in a first direction DR1 and a short side in a second direction DR2 intersecting the first direction DR1. The display device DD has a quadrangle whose vertexes are rounded. However, the shape of the display device DD is not limited thereto. For example, the display device DD may be provided in various shapes (e.g., a circular shape). The display device DD may display an image IM in a third direction DR3, on a display surface IS parallel to the first direction DR1 and the second direction DR2. The display surface IS on which the image IM is displayed may correspond to a front surface of the display device DD.

According to an embodiment, a front surface (or top surface) and a rear surface (or a bottom surface) of each of members are defined based on a direction that the image IM is displayed. The front surface and the rear surface may be opposite to each other in the third direction DR3, and a normal direction of each of the front surface and the rear surface may be parallel to the third direction DR3.

The distance between the front surface and the rear surface in the third direction DR3 may correspond to the thickness of the display device DD in the third direction DR3. Meanwhile, directions that the first, second, and third directions DR1, DR2, and, DR3 indicate may be a relative concept and may be changed to different directions.

The display surface IS of the display device DD may include a transmission area TA and a bezel area BZA. The transmission area TA may be an area in which the image IM is displayed. A user visually perceives the image IM through the transmission area TA. In this embodiment, the transmission area TA is illustrated in the shape of a quadrangle whose vertexes are rounded. However, the transmission area TA is illustrated by way of example. For example, the transmission area TA may have various shapes, not limited to any one embodiment.

The bezel area BZA is disposed adjacent to the transmission area TA. The bezel area BZA may have a given color. The bezel area BZA may surround the transmission area TA. Accordingly, the shape of the transmission area TA may be substantially defined by the bezel area BZA. However, the bezel area BZA is illustrated by way of example. The bezel area BZA may be disposed adjacent to only one side of the transmission area TA or may be omitted. According to an embodiment of the present disclosure, the display device DD may include various embodiments, and not limited to any one embodiment.

As illustrated in FIG. 2, the display device DD may include a window WM, a display panel DP, and an external case EDC.

The window WM protects the upper surface of the display panel DP. The window WM may be optically transmissive. The window WM may include a transmissive material to output the image IM. For example, the window WM may be formed of glass, sapphire, plastic, or the like. An example in which the window WM is implemented with a single layer is illustrated, but the present disclosure is not limited thereto. For example, the window WM may include a plurality of layers.

Meanwhile, although not illustrated, the bezel area BZA of the display device DD may be formed by printing one area of the window WM with a material including a specific color. According to an embodiment of the present disclosure, the window WM may include a light shielding pattern for defining the bezel area BZA. The light shielding pattern, which is an organic film having a color, may be, for example, formed by a coating process.

The window WM may be coupled to the display panel DP through an adhesive film. According to an embodiment of the present disclosure, the adhesive film may include an optically clear adhesive film (OCA). However, the adhesive film is not limited thereto, but may include a typical adhesive agent and adhesion agent. For example, the adhesive film may include optically clear resin (OCR), or a pressure sensitive adhesive film (PSA).

An anti-reflective layer may be further interposed between the window WM and the display panel DP. The anti-reflective layer reduces reflection of external light incident from an upper portion of the window WM. According to an embodiment of the present disclosure, the anti-reflective layer may include a retarder and a polarizer. The retarder may be a retarder of a film type or a liquid crystal coating type and may include a $\lambda/2$ retarder and/or a $\lambda/4$ retarder. The polarizer may also have a film type or a liquid crystal coating type. The film type may include a stretch-type synthetic resin film, and the liquid crystal coating type may include liquid crystals arranged in a given direction. The retarder and the polarizer may be implemented with one polarization film.

As an example of the present disclosure, the anti-reflective layer may also include color filters. The arrangement of the color filters may be determined in consideration of colors of light generated from a plurality of pixels included in the display panel DP. The anti-reflective layer may further include a light shielding pattern.

The display panel DP may include a display area DA on which the image IM is displayed and a non-display area NDA disposed adjacent to the display area DA. The display area DA may be an area through which the image IM provided from the display panel DP is output. The non-display area NDA may surround the display area DA. However, this is illustrated by way of an example. The non-display area NDA may be defined in various shapes, not limited to any one embodiment. For example, the non-display area NDA may be provided adjacent to one or both sides of the display area DA. According to an embodiment, the display area DA of the display panel DP may correspond to at least a portion of the transmission area TA, and the non-display area NDA may correspond to the bezel area BZA.

According to an embodiment of the present disclosure, the display panel DP may be a light emitting display panel. For example, the display panel DP may be an organic light emitting display panel, an inorganic light emitting display panel, or a quantum dot light emitting display panel. An emission layer of the organic light emitting display panel may include an organic light emitting material. An emission layer of the inorganic light emitting display panel may include an inorganic light emitting material. An emission layer of the quantum dot light emitting display panel may include a quantum dot and a quantum rod. The following description will be made that the display panel DP is an organic light emitting display panel according to the present embodiment.

As an example of the present disclosure, the display device DD may further include an input sensing layer for sensing an external input (e.g., a touch event, or the like). The input sensing layer may be directly disposed on the display panel DP. According to an embodiment of the present disclosure, the input sensing layer may be formed on the display panel DP through a subsequent process. That is, when the input sensing layer is directly disposed on the display panel DP, an adhesive film may not be interposed between the input sensing layer and the display panel DP. However, the present disclosure is not limited thereto. The adhesive film may be interposed between the input sensing layer and the display panel DP. In this case, the input sensing layer is not fabricated together with the display panel DP through the subsequent processes. In other words, after fabricating the input sensing layer through a process separate from that of the display panel DP, the input sensing layer may be fixed on a top surface of the display panel DP through the adhesive film.

As an example of the present disclosure, the display device DD may further include a driver chip DIC, a controller CP, and a flexible circuit film FCB. As an example of the present disclosure, the display panel DP may further include a pad area PP extending from the non-display area NDA.

The driver chip DIC and pads may be positioned in the pad area PP. However, the present disclosure is not limited thereto. Alternatively, the driver chip DIC may be mounted on the flexible circuit film FCB. The display panel DP may be electrically connected to the flexible circuit film FCB through the pads. As an example of the present disclosure, the controller CP may be mounted on the flexible circuit film FCB. The flexible circuit film FCB may include a plurality of driving elements. The plurality of driving elements may include a circuit part to drive the display panel DP. As an example of the present disclosure, the pad area PP may be bent to be positioned on a rear surface of the display panel DP.

The external case EDC may be coupled to the window WM to define the outer appearance of the display device DD. The external case EDC may absorb external shocks from the outside and may prevent a foreign material/moisture or the like from being infiltrated into the display panel DP such that components accommodated in the external case EDC are protected. Meanwhile, as an example of the present disclosure, the external case EDC may be implemented by coupling a plurality of accommodating members.

The display device DD according to an embodiment may further include an electronic module including various functional modules for operating the display panel DP, a power supply module for supplying a power necessary for overall operations of the display device DD, a bracket coupled with the external case EDC to partition an inner space of the display device DD, and the like.

Figure 3:
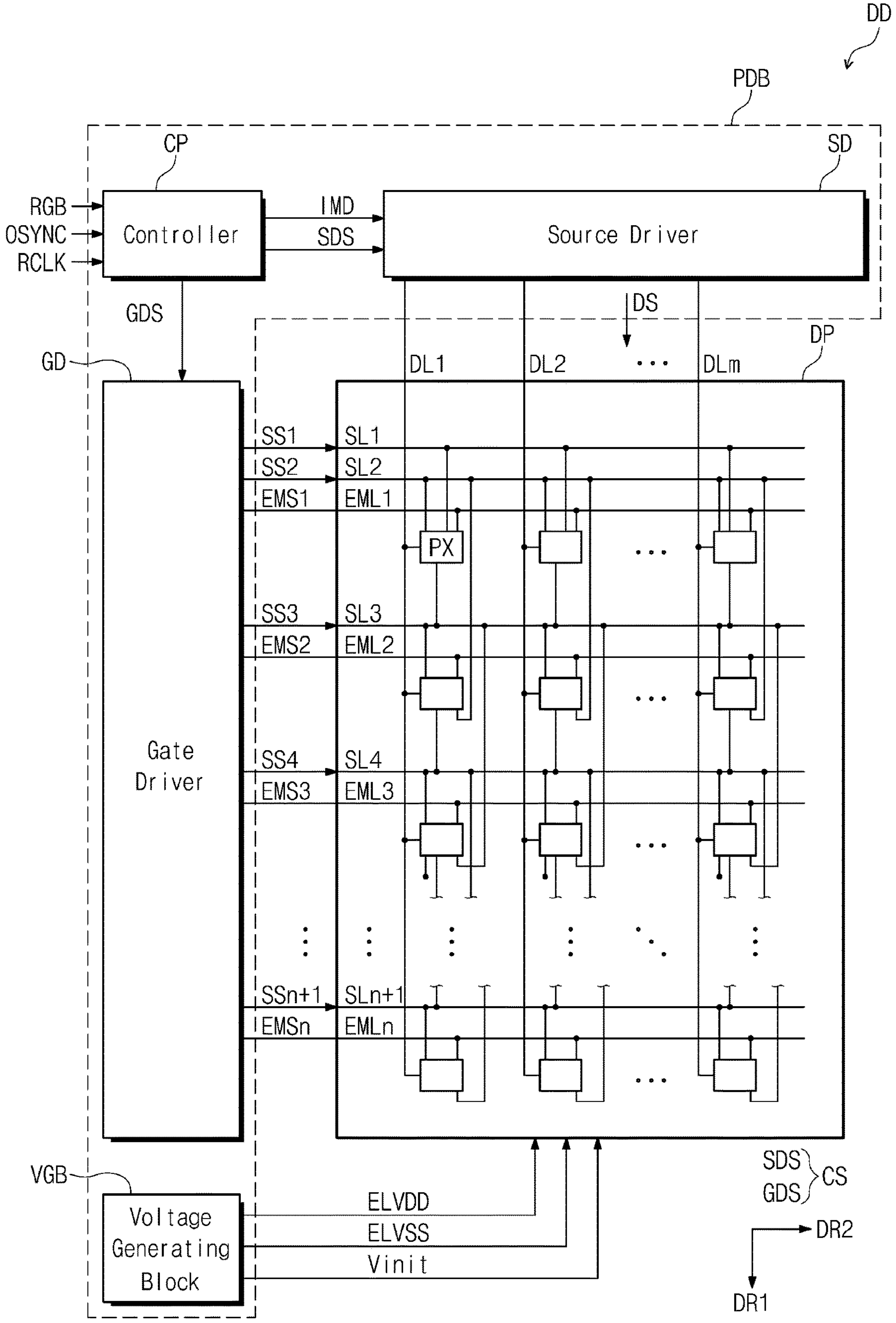
FIG. 3 is a block diagram of a display device according to an embodiment of the present disclosure.

FIG. 3 is a block diagram of a display device according to an embodiment of the present disclosure.

Referring to FIG. 3, the display device DD includes the display panel DP and a panel driving block PDB. The panel driving block PDB controls driving of the display panel DP.

As an example of the present disclosure, the panel driving block PDB includes the controller CP, a source driver SD, a gate driver GD, and a voltage generating block VGB.

The controller CP receives an image signal RGB, an external synchronization signal OSYNC, and a reference clock signal RCLK from the outside. The controller CP may transform a data format of the image signal RGB to generate image data IMD that is matched with the specification of an interface with the source driver SD. The controller CP generates a control signal CS based on the external synchronization signal OSYNC and the reference clock signal RCLK. The control signal CS includes a source control signal SDS and a gate control signal GDS. As an example of the present disclosure, the controller CP may generate an internal synchronization signal ISYNC (refer to FIG. 4) based on the reference clock signal RCLK, etc., and may generate the control signal CS based on the internal synchronization signal ISYNC. However, the present disclosure is not limited thereto, and the controller CP may refer to the external synchronization signal OSYNC for generating the internal synchronization signal ISYNC.

The controller CP may provide the image data IMD and the source control signal SDS to the source driver SD. The source control signal SDS may include a signal for starting the operation of the source driver SD. The source driver SD generates a data signal DS based on the image data IMD in response to the source control signal SDS. The source driver SD outputs the data signal DS to a plurality of data lines DL1 to DLm to be described later. The data signal DS is an analog voltage corresponding to a grayscale value of the image data IMD.

The controller CP provides the gate control signal GDS to the gate driver GD. The gate control signal GDS may include a signal for starting the operation of the gate driver GD and a scan clock signal for determining output timing of scan signals SS1 to SSn+1. The gate driver GD generates the scan signals SS1 to SSn+1 based on the gate control signal GDS. The gate driver GD outputs the scan signals SS1 to SSn+1 to a plurality of scan lines SL1 to SLn+1 to be described later.

As an example of the present disclosure, an emission control signal may be included in the gate control signal GDS. The gate driver GD may output emission control signals EMS1 to EMSn to emission lines EML1 to EMLn in response to the emission control signal. Alternatively, the panel driving block PDB may further include a separate light emission driving block generating the emission control signals EMS1 to EMSn.

As an example of the present disclosure, the controller CP may further generate a voltage control signal. The controller CP provides the voltage control signal to the voltage generating block VGB. The voltage generating block VGB generates voltages necessary for the operation of the display panel DP. As an example of the present disclosure, the voltage generating block VGB generates a first driving voltage ELVDD, a second driving voltage ELVSS, and an initialization voltage Vinit. The voltage generating block VGB may operate under the control of the controller CP. As an example of the present disclosure, a voltage level of the first driving voltage ELVDD is greater than a voltage level of the second driving voltage ELVSS. For example, the voltage level of the first driving voltage ELVDD may be approximately 3V to 6V. The voltage level of the second driving voltage ELVSS may be approximately 0V to −3V. A voltage level of the initialization voltage Vinit is smaller than the voltage level of the second driving voltage ELVSS. For example, the voltage level of the initialization voltage Vinit may be approximately −3.1V to −6V. However, the present disclosure is not limited thereto, and the voltage level of the first driving voltage ELVDD, the voltage level of the second driving voltage ELVSS, and the voltage level of the initialization voltage Vinit may vary depending on the shapes of the display device DD and the display panel DP.

The display panel DP includes the plurality of scan lines SL1 to SLn+1, the plurality of data lines DL1 to DLm, the plurality of emission lines EML1 to EMLn, and a plurality of pixels PX.

The scan lines SL1 to SLn+1 extend from the gate driver GD in the second direction DR2 and are arranged to be spaced apart from each other in the first direction DR1. The data lines DL1 to DLm extend from the source driver SD in the first direction DR1 and are arranged to be spaced apart from each other in the second direction DR2.

Each of the pixels PX is electrically connected to three corresponding scan lines among the scan lines SL1 to SLn+1. Also, each of the pixels PX is electrically connected with one corresponding emission line among the emission lines EML1 to EMLn and one corresponding data line among the data lines DL1 to DLm. For example, as illustrated in FIG. 3, a first pixel of pixels may be connected with the first to third scan lines SL1, SL2, and SL3, the first emission line EML1, and the first data line DL1. However, as an example of the present disclosure, according to the configuration of the driving circuit of the pixels PX, a connection relationship of the pixels PX, the scan lines SL1 to SLn+1, the data lines DL1 to DLm, and the emission lines EML1 to EMLn may be changed.

Each of the pixels PX includes a light-emitting diode and a pixel circuit part controlling an emission operation of the light-emitting diode. The pixel circuit part may include a plurality of transistors and a capacitor. Each of the pixels PX receives the first driving voltage ELVDD, the second driving voltage ELVSS, and the initialization voltage Vinit.

The pixels PX may include a plurality of groups, each of which has light emitting diodes that generate light of different colors from each other. For example, the pixels PX may include red pixels generating red color light, green pixels generating green color light, and blue pixels generating blue color light. A light-emitting diode of a red pixel, a light-emitting diode of a green pixel, and a light-emitting diode of a blue pixel may include emission layers of different materials. As an example of the present disclosure, each of the pixels PX may include white pixel generating a white color light. In this case, the anti-reflective layer included in the display device DD may further include color filters. The display device DD may display the image IM (refer to FIG. 1) based on the light emitted by the white color light passing through the color filters. However, as an example of the present disclosure, the pixels PX may be formed of blue pixels generating the blue color light. In this case, the display device DD may display the image IM based on the light emitted by the blue color light passing through the color filters. As an example of the present disclosure, when the blue color light passes through the color filters, the light passing through the color filters may have a color of a wavelength different from that of the blue color light. As an example of the present disclosure, each of the color filters may include a quantum dot. The quantum dot is a particle which adjust the wavelength of light emitted by converting the wavelength of incident light. The quantum dot may adjust the wavelength of the light emitted depending on a particle size of the quantum dot. Accordingly, the quantum dot may emit a light having red color light, green color light, and blue color light.

Figure 4:
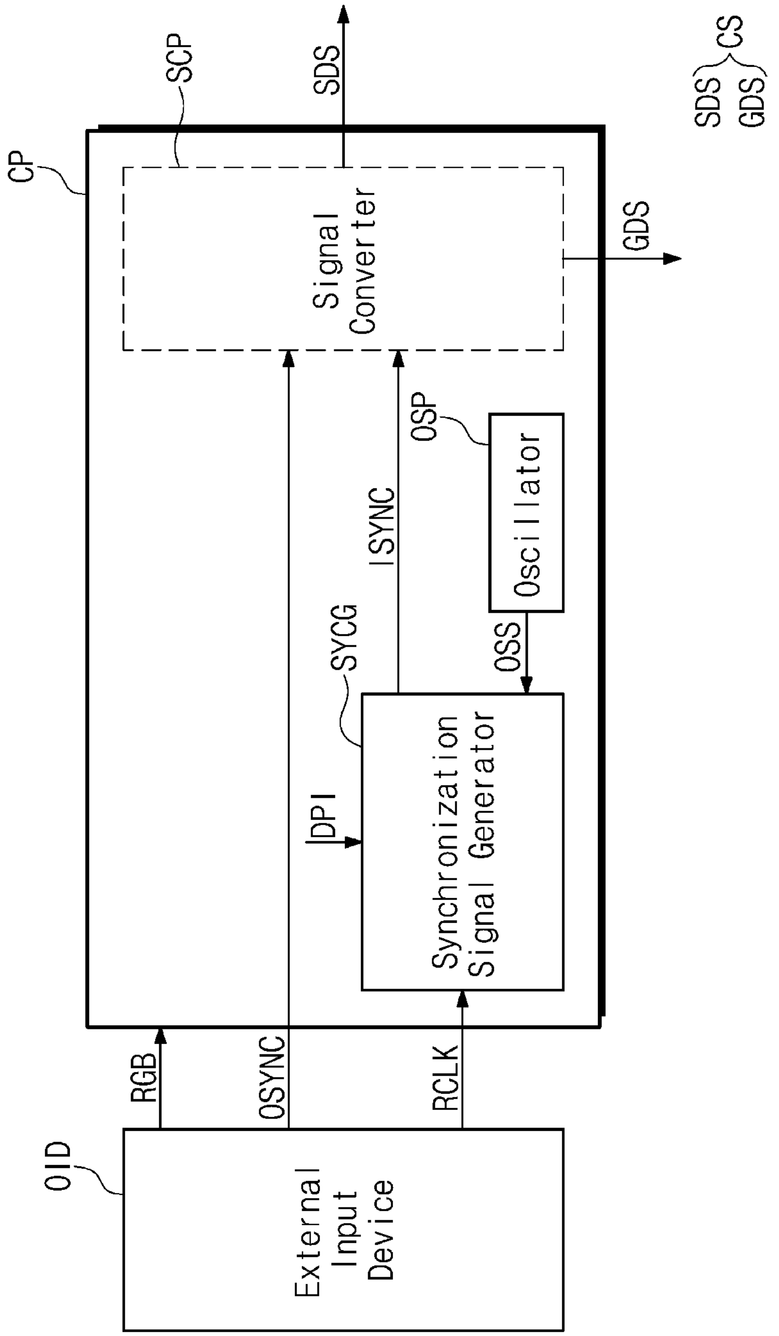
FIG. 4 is a block diagram illustrating a configuration of a controller, according to an embodiment of the present disclosure.
Figure 5A:
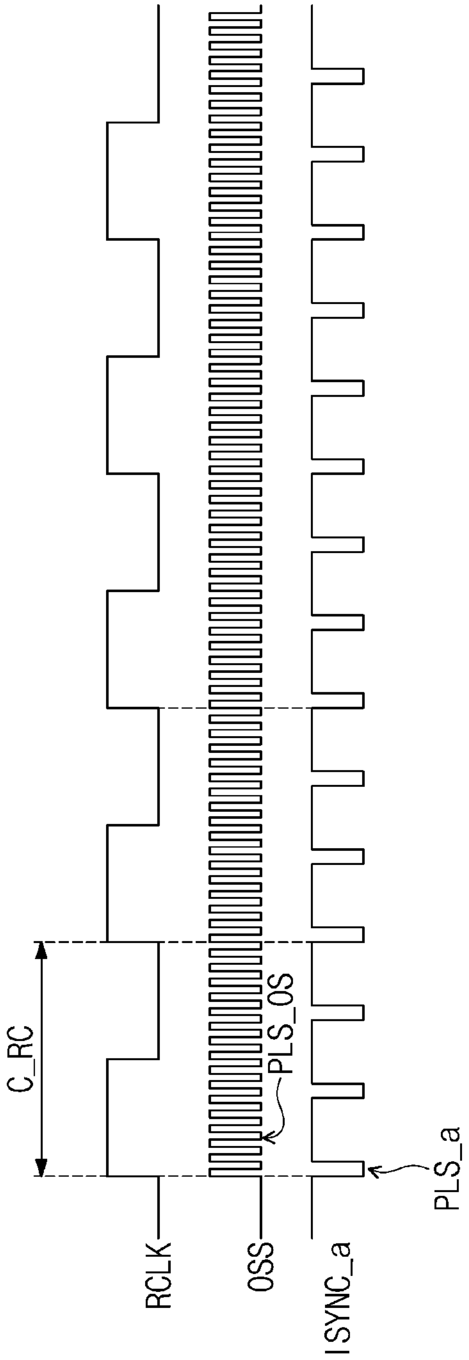
FIGS. 5A and 5B are waveform diagrams for describing an operation of a synchronization signal generator, according to an embodiment of the present disclosure.
Figure 5B:
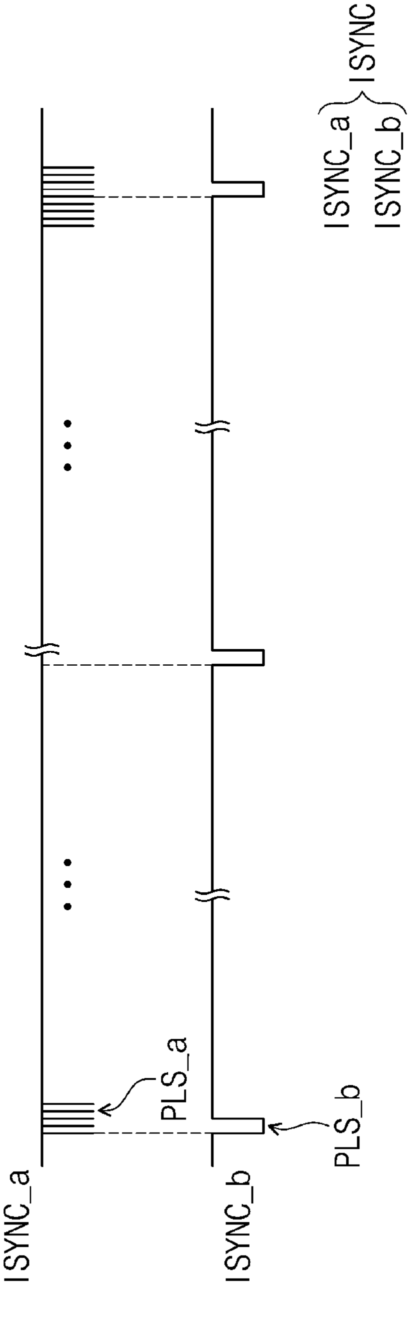

FIG. 4 is a block diagram illustrating a configuration of a controller according to an embodiment of the present disclosure. FIGS. 5A and 5B are waveform diagrams for describing an operation of a synchronization signal generator according to an embodiment of the present disclosure.

Referring to FIG. 4, the controller CP includes a synchronization signal generator SYCG, an oscillator OSP, and a signal converter SCP. The controller CP receives the image signal RGB, the external synchronization signal OSYNC and the reference clock signal RCLK from the outside. As an example of the present disclosure, the controller CP may receive the image signal RGB, the external synchronization signal OSYNC and the reference clock signal RCLK from an external input device OID. The external input device OID may include a graphic processing unit (GPU) that generates a signal for displaying various types of information as graphics or text on the display device DD.

Referring to FIGS. 4, 5A and 5B, the synchronization signal generator SYCG receives the reference clock signal RCLK from the external input device OID. As an example of the present disclosure, the reference clock signal RCLK may be a signal for matching an operation timing of the external input device OID with an operation timing of the display device DD (refer to FIG. 1).

However, the present disclosure is not limited thereto. Alternatively, the reference clock signal RCLK may be provided from an external device different from the external input device OID.

The synchronization signal generator SYCG receives an oscillation signal OSS from the oscillator OSP. The oscillator OSP generates the oscillation signal OSS having an oscillation frequency determined by the oscillator. The oscillator OSP provides the generated oscillation signal OSS to the synchronization signal generator SYCG.

The synchronization signal generator SYCG generates the internal synchronization signal ISYNC based on the reference clock signal RCLK and the oscillation signal OSS. As an example of the present disclosure, the internal synchronization signal ISYNC may include a horizontal synchronization signal ISYNC_a and a vertical synchronization signal ISYNC_b. The synchronization signal generator SYCG may count the number of pulses PLS_OS of the oscillation signal OSS included in one period C_RC of the reference clock signal RCLK to generate the horizontal synchronization signal ISYNC_a and the vertical synchronization signal ISYNC_b. As an example of the present disclosure, when the number of pulses PLS_OS of the oscillation signal OSS included in one period C_RC of the reference clock signal RCLK is 'n', the synchronization signal generator SYCG may generate the horizontal synchronization signal ISYNC_a having 'm' pulses of PLS_a in one period C_RC of the reference clock signal RCLK. As an example of the present disclosure, the synchronization signal generator SYCG may receive a panel information signal DPI including information such as the resolution of the display panel DP (refer to FIG. 2). In this case, the synchronization signal generator SYCG may determine 'n' and 'm' based on the panel information signal DPI. As an example of the present disclosure, 'n' and 'm' may be 1 or more natural numbers.

Also, the synchronization signal generator SYCG may generate the vertical synchronization signal ISYNC_b based on the horizontal synchronization signal ISYNC_a. As an example of the present disclosure, the synchronization signal generator SYCG may generate the vertical synchronization signal ISYNC_b such that 'k' pulses of PLS_a of the horizontal synchronization signal ISYNC_a are included in one period of the vertical synchronization signal ISYNC_b. The 'k' number of pulses PLS_a of the horizontal synchronization signal ISYNC_a may be included between two adjacent pulses PLS_b of the vertical synchronization signal ISYNC_b. As an example of the present disclosure, 'k' may be a natural number of 1 or more.

However, the present disclosure is not limited thereto. Alternatively, the synchronization signal generator SYCG may receive the external synchronization signal OSYNC. The synchronization signal generator SYCG may generate the internal synchronization signal ISYNC synchronized with the external synchronization signal OSYNC with reference to the timing of the external synchronization signal OSYNC. In detail, when the external synchronization signal OSYNC is provided in a normal state, the synchronization signal generator SYCG may generate the internal synchronization signal ISYNC with reference to the timing of the external synchronization signal OSYNC.

The synchronization signal generator SYCG provides the internal synchronization signal ISYNC to the signal converter SCP. In detail, the synchronization signal generator SYCG provides the horizontal synchronization signal ISYNC_a and the vertical synchronization signal ISYNC_b to the signal converter SCP. The signal converter SCP receives the internal synchronization signal ISYNC from the synchronization signal generator SYCG and generates the source control signal SDS and the gate control signal GDS based on the internal synchronization signal ISYNC. In detail, the signal converter SCP may generate the source control signal SDS and the gate control signal GDS based on the horizontal synchronization signal ISYNC_a and the vertical synchronization signal ISYNC_b.

Figure 6A:
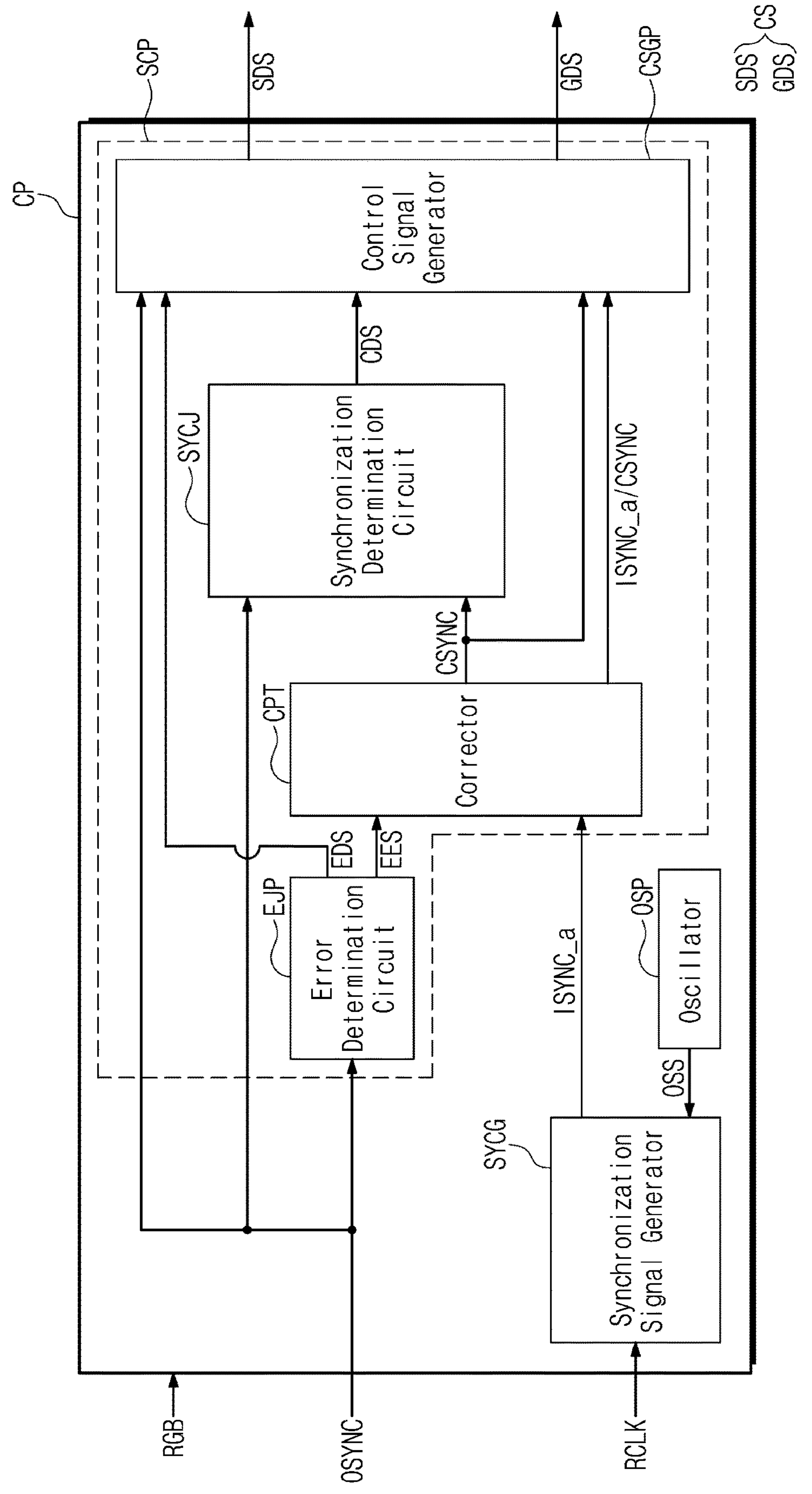
FIGS. 6A and 6B are block diagrams illustrating a configuration of a controller, according to an embodiment of the present disclosure.
Figure 6B:
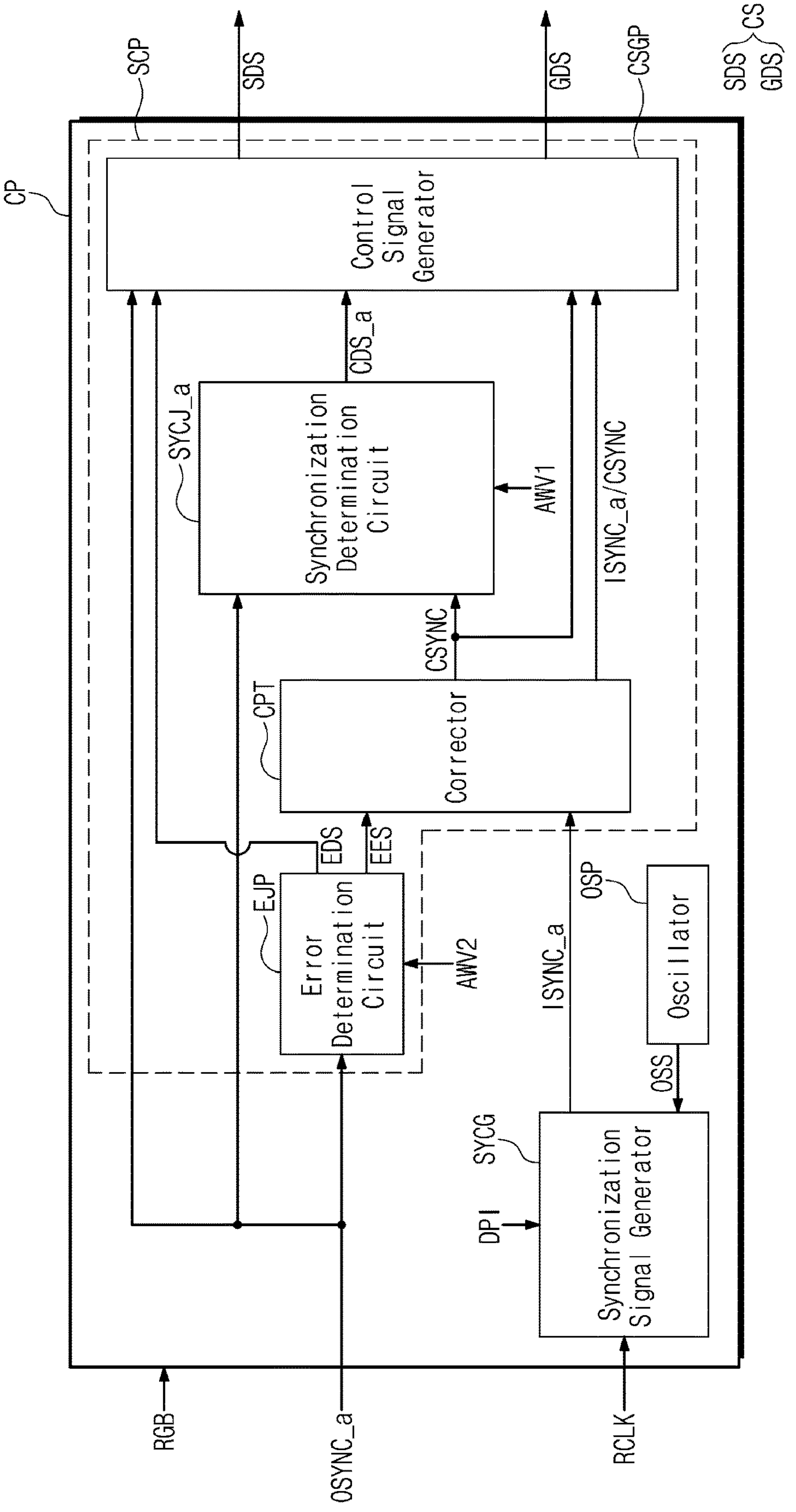

FIGS. 6A and 6B are block diagrams illustrating a configuration of a controller, according to an embodiment of the present disclosure. FIGS. 7A to 7D are waveform diagrams for describing an operation of a signal converter according to an embodiment of the present disclosure. Hereinafter, components and signals that are the same as the components and signals described with reference to FIGS. 4 to 5B are marked by the same reference signs, and thus, additional description will be omitted to avoid redundancy.

Figure 7A:
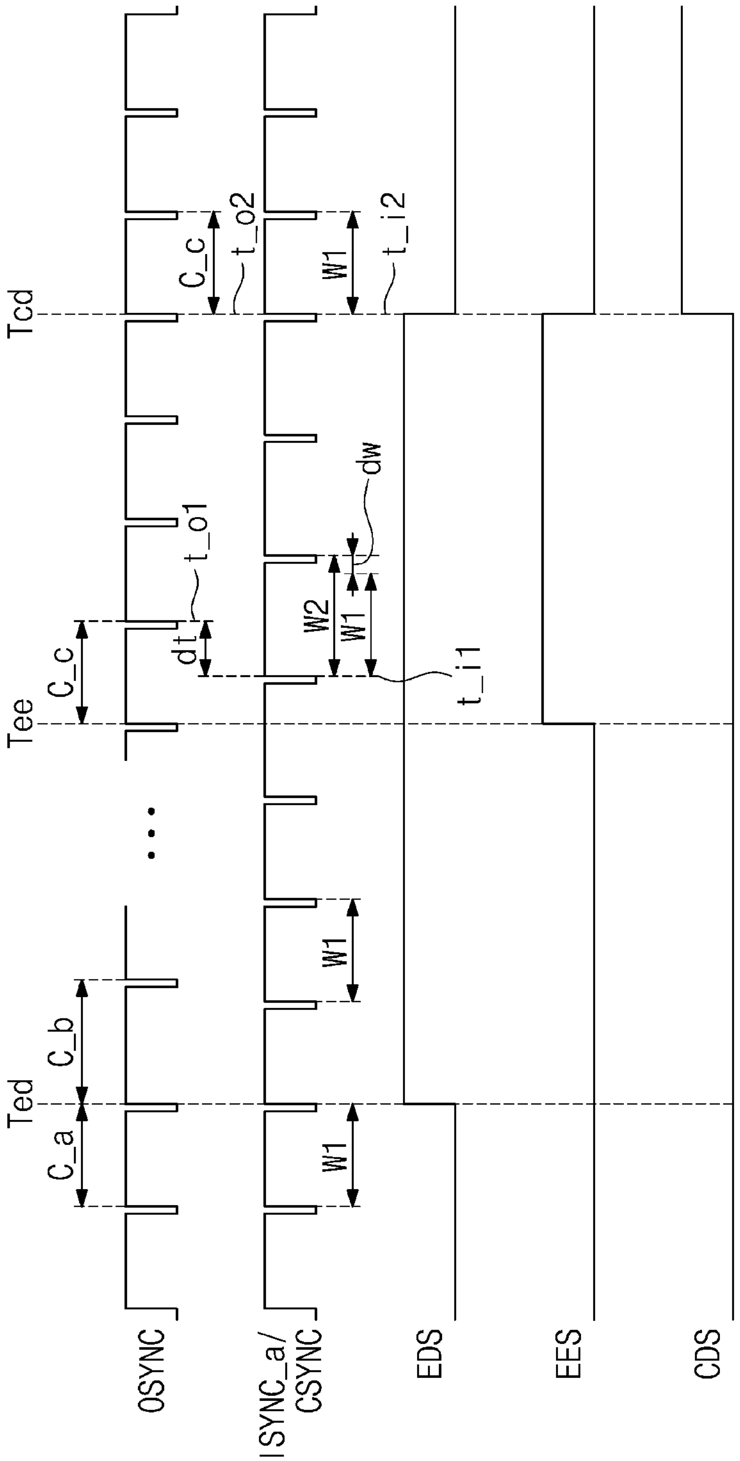
FIGS. 7A, 7B, 7C and 7D are waveform diagrams for describing an operation of a signal converter, according to an embodiment of the present disclosure.

Referring to FIGS. 6A and 7A, the synchronization signal generator SYCG generates the horizontal synchronization signal ISYNC_a based on the reference clock signal RCLK and the oscillation signal OSS. Although only the horizontal synchronization signal ISYNC_a is illustrated in FIG. 6A for convenience of description, the synchronization signal generator SYCG may further generate the vertical synchronization signal ISYNC_b (refer to FIG. 5B).

The signal converter SCP includes an error determination circuit EJP, a corrector CPT, a synchronization determination circuit SYCJ, and a control signal generator CSGP. The error determination circuit EJP receives the external synchronization signal OSYNC from the external input device OID (refer to FIG. 4).

The error determination circuit EJP determines whether the received external synchronization signal OSYNC is in an abnormal state. In detail, when a first period C_a of the external synchronization signal OSYNC is different from a second period C_b that is a period subsequent to the first period Ca, the error determination circuit EJP may determine that the external synchronization signal OSYNC is in the abnormal state. As an example of the present disclosure, FIG. 7A illustrates a state in which the width of the second period C_b of the external synchronization signal OSYNC is greater than the width of the first period C_a during the abnormal state of the external synchronization signal OSYNC. However, the present disclosure is not limited thereto. Even when the width of the second period C_b of the external synchronization signal OSYNC is less than the width of the first period C_a or the waveform of the second period C_b is different from the waveform of the first period C_a, the error determination circuit EJP may determine that the external synchronization signal OSYNC is in the abnormal state. In addition, even when the external synchronization signal OSYNC is not provided after only the signal corresponding to the first period Ca of the external synchronization signal OSYNC is provided, the error determination circuit EJP may determine that the external synchronization signal OSYNC is in the abnormal state. In addition, alternatively, the error determination circuit EJP receives both the signal corresponding to the first period C_a and the signal corresponding to the second period C_b of the external synchronization signal OSYNC, and then may determine whether the external synchronization signal OSYNC is in the abnormal state by comparing the first period C_a with the second period C_b of the external synchronization signal OSYNC.

When it is determined that the external synchronization signal OSYNC is in the abnormal state, the error determination circuit EJP generates an error detection signal EDS. The error determination circuit EJP may provide the error detection signal EDS to the control signal generator CSGP. As an example of the present disclosure, the term "generating a signal" may mean activating a signal. The component receiving the activated signal may perform an operation different from the inactive section in the active section of the corresponding signal. As an example of the present disclosure, the error determination circuit EJP may generate the error detection signal EDS from a time point when the abnormal state of the external synchronization signal OSYNC is determined (Ted, hereinafter, refer to a first time point) to a time point when a timing signal CDS, which will be described later, is generated (Tcd, hereinafter, refer to a third time point).

As an example of the present disclosure, when the external synchronization signal OSYNC is restored from the abnormal state to a normal state, the error determination circuit EJP generates an error end signal EES at a time point of recovery. The error determination circuit EJP may provide the error end signal EES to the corrector CPT. In detail, after determining that the external synchronization signal OSYNC is in the abnormal state, when a third period C_c subsequent to the second period C_b and the first period C_a of the external synchronization signal OSYNC are the same, the error determination circuit EJP may determine that the external synchronization signal OSYNC is restored from the abnormal state to the normal state. In this case, the error determination circuit EJP may generate the error end signal EES. As an example of the present disclosure, from the time point when it is determined that the external synchronization signal OSYNC is restored to the normal state (Tee, hereinafter, a second time) to the third time Tcd, the error determination circuit EJP may generate the error end signal EES. As an example of the present disclosure, the external synchronization signal OSYNC may have the third period C_c from the second time Tee. However, the present disclosure is not limited thereto. Alternatively, after receiving both a signal corresponding to the first period C_a and a signal corresponding to the third period C_c of the external synchronization signal OSYNC, the second time point Tee may be a time point at which it is determined that the external synchronization signal OSYNC is restored to the normal state by comparing the first period C_a with the third period C_c of the external synchronization signal OSYNC.

The corrector CPT receives the horizontal synchronization signal ISYNC_a from the synchronization signal generator SYCG. The corrector CPT corrects the horizontal synchronization signal ISYNC_a to generate a corrected synchronization signal CSYNC. As an example of the present disclosure, the corrector CPT may receive the error end signal EES from the error determination circuit EJP. When the error end signal EES is provided, the corrector CPT may correct the horizontal synchronization signal ISYNC_a to generate the corrected synchronization signal CSYNC. As an example of the present disclosure, during the active section of the error end signal EES (the section from the second time Tee to the third time Tcd), the corrector CPT may generate the corrected synchronization signal CSYNC by differently correcting each period of the pulses included in the horizontal synchronization signal ISYNC_a. In detail, during an active section of the error end signal EES, one period W2 (hereinafter, a correction period) of the corrected synchronization signal CSYNC generated by the corrector CPT is different from one period W1 (hereinafter, a horizontal period) of the horizontal synchronization signal ISYNC_a. As an example of the present disclosure, the correction period W2 may be greater than the horizontal period W1. In this case, as an example of the present disclosure, the horizontal period W1 may be the same as the first and third periods C_a and C_c. Accordingly, the correction period W2 may be greater than the first and third periods C_a and C_c. Hereinafter, a case in which the first and third periods C_a and C_c are same as the horizontal period W1 will be described as a reference.

As an example of the present disclosure, the corrector CPT may provide the horizontal synchronization signal ISYNC_a or the corrected synchronization signal CSYNC to the control signal generator CSGP. In detail, the corrector CPT may provide the horizontal synchronization signal ISYNC_a to the control signal generator CSGP before correcting the horizontal synchronization signal ISYNC_a, and the corrector CPT may provide the corrected synchronization signal CSYNC to the control signal generator CSGP after generating the corrected synchronization signal CSYNC by correcting the horizontal synchronization signal ISYNC_a.

As an example of the present disclosure, the horizontal synchronization signal ISYNC_a may be a signal synchronized with the external synchronization signal OSYNC in the normal state. Accordingly, before the first time point Ted, the external synchronization signal OSYNC and the horizontal synchronization signal ISYNC_a may be synchronized with each other. However, the external synchronization signal OSYNC in the abnormal state and the horizontal synchronization signal ISYNC_a are not synchronized with each other from the first time point Ted to the second time point Tee. The external synchronization signal OSYNC in the normal state and the horizontal synchronization signal ISYNC_a may still not be synchronized with each other from the second time point Tee to the third time point Tcd because the horizontal synchronization signal ISYNC_a has a uniform horizontal period W1 from the first time point Ted to the second time point Tee, but the external synchronization signal OSYNC has the second period C_b different from the first period C_a from the first time point Ted to before the second time point Tee. Accordingly, to synchronize the external synchronization signal OSYNC in the normal state provided after the second time point Tee and the horizontal synchronization signal ISYNC_a, the corrector CPT corrects the horizontal synchronization signal ISYNC_a to the corrected synchronization signal CSYNC.

The synchronization determination circuit SYCJ receives the external synchronization signal OSYNC from the external input device OID and receives the corrected synchronization signal CSYNC from the corrector CPT. The synchronization determination circuit SYCJ determines whether the external synchronization signal OSYNC is synchronized with the corrected synchronization signal CSYNC.

As an example of the present disclosure, the external synchronization signal OSYNC provided after the second time point Tee may not be synchronized with the corrected synchronization signal CSYNC. In detail, a start time point t_o1 of the active section of the external synchronization signal OSYNC and a start time point t_i1 of the active section of the corrected synchronization signal CSYNC may be different from each other. The correction period W2 is different from the third period C_c. As time elapses, the external synchronization signal OSYNC may be synchronized with the corrected synchronization signal CSYNC. In detail, a difference between the start time point t_o1 of the active section of the external synchronization signal OSYNC and the start time point t_i1 of the active section of the corrected synchronization signal CSYNC may be referred to as a first difference dt, and a difference between the correction period W2 and the horizontal period W1 may be referred to as a second difference dw. In this case, the difference between the correction period W2 and the third period C_c is also the same as the second difference dw. Accordingly, as the first difference dt gradually decreases due to the second difference dw over time, at the third time point Tcd, a start time point t_o2 of the active section of the external synchronization signal OSYNC may coincide with a start time point t_i2 of the active section of the corrected synchronization signal CSYNC.

As an example of the present disclosure, the second difference dw is less than the first difference dt. The synchronization determination circuit SYCJ generates the timing signal CDS at the third time point Tcd, which is a time at which the external synchronization signal OSYNC is synchronized with the corrected synchronization signal CSYNC. As an example of the present disclosure, when it is determined that the external synchronization signal OSYNC is in the abnormal state or when the external synchronization signal OSYNC is not synchronized with the corrected synchronization signal CSYNC even if the external synchronization signal OSYNC is restored from the abnormal state to the normal state, the timing signal CDS may have an inactive section.

Figure 7B:
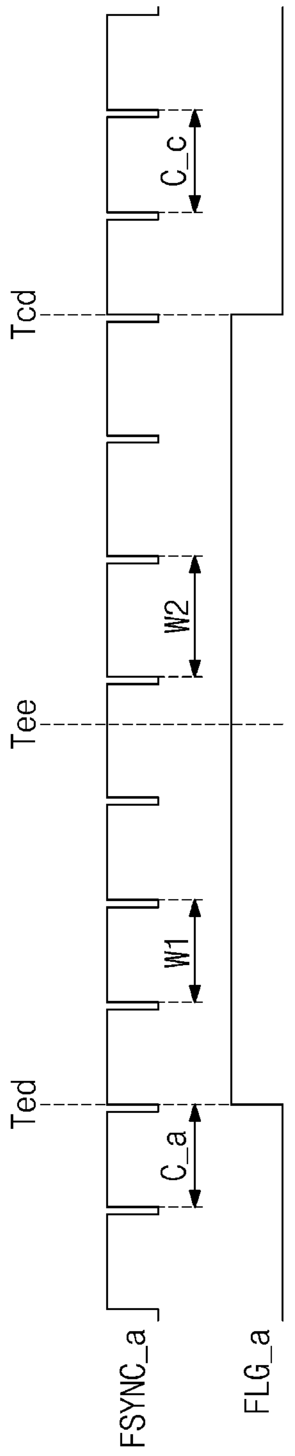

FIG. 7B illustrates a first final synchronization signal FSYNC_a, which is a synchronization signal serving as a reference for generating the source control signal SDS and the gate control signal GDS in the control signal generator CSGP, and a first flag signal FLG_a for indicating an operation state of the controller CP.

As an example of the present disclosure, the first final synchronization signal FSYNC_a is generated based on the external synchronization signal OSYNC before the first time point Ted and has the first period C_a. The first final synchronization signal FSYNC_a is generated based on the horizontal synchronization signal ISYNC_a from the first time point Ted to the second time point Tee, and has the horizontal period W1. The first final synchronization signal FSYNC_a is generated based on the corrected synchronization signal CSYNC from the second time point Tee to the third time point Tcd, and has the correction period W2. The first final synchronization signal FSYNC_a is generated based on the external synchronization signal OSYNC again after the third time Tcd and has the third period C_c.

As an example of the present disclosure, when the controller CP controls the driving of the display panel DP with the control signal CS generated based on the external synchronization signal OSYNC, the first flag signal FLG_a includes a section having a first state (e.g., a low level). When the controller CP controls the driving of the display panel DP with the control signal CS generated based on the horizontal synchronization signal ISYNC_a or the corrected synchronization signal CSYNC, the first flag signal FLG_a may include a section having a second state (e.g., a high level). The state of the first flag signal FLG_a is determined according to which synchronization signal is used for the controller CP. The first flag signal FLG_a may have the first state which is the high level and the second state which is the low level.

As an example of the present disclosure, the first flag signal FLG_a may be generated by the control signal generator CSGP (refer to FIG. 6A). When the control signal generator CSGP receives the error detection signal EDS (refer to FIG. 6A), the control signal generator CSGP may generate the first flag signal FLG_a having the second state, and when the control signal generator CSGP receives the timing signal CDS (refer to FIG. 6A), the control signal generator CSGP may generate the first flag signal FLG_a having the first state.

Referring to FIGS. 6A and 7B, the control signal generator CSGP receives the external synchronization signal OSYNC from the external input device OID and receives the horizontal synchronization signal ISYNC_a from the corrector CPT. As an example, the control signal generator CSGP generates the source control signal SDS and the gate control signal GDS based on the external synchronization signal OSYNC before the first time point Ted. That is, when the external synchronization signal OSYNC is in the normal state, the control signal generator CSGP generates the source control signal SDS and the gate control signal GDS based on the external synchronization signal OSYNC.

When it is determined that the external synchronization signal OSYNC is in the abnormal state, the control signal generator CSGP may receive the error detection signal EDS from the error determination circuit EJP. When the error detection signal EDS is received, the control signal generator CSGP generates the source control signal SDS and the gate control signal GDS based on the horizontal synchronization signal ISYNC_a received from the corrector CPT. As an example of the present disclosure, the control signal generator CSGP may generate the source control signal SDS and the gate control signal GDS based on the horizontal synchronization signal ISYNC_a from the first time point Ted to the second time point Tee. In detail, when the external synchronization signal OSYNC is in the abnormal state, the control signal generator CSGP generates the source control signal SDS and the gate control signal GDS based on the horizontal synchronization signal ISYNC_a received from the corrector CPT.

When it is determined that the external synchronization signal OSYNC is restored from the abnormal state to the normal state, the control signal generator CSGP receives the corrected synchronization signal CSYNC from the corrector CPT. As an example of the present disclosure, the control signal generator CSGP generates the source control signal SDS and the gate control signal GDS based on the corrected synchronization signal CSYNC. In detail, when the external synchronization signal OSYNC is not synchronized with the corrected synchronization signal CSYNC even when the external synchronization signal OSYNC is restored to the normal state, the control signal generator CSGP generates the source control signal SDS and the gate control signal GDS based on the corrected synchronization signal CSYNC.

When it is determined that the external synchronization signal OSYNC is synchronized with the corrected synchronization signal CSYNC, the control signal generator CSGP receives the timing signal CDS from the synchronization determination circuit SYCJ. When the timing signal CDS is received, the control signal generator CSGP may generate the source control signal SDS and the gate control signal GDS based on the external synchronization signal OSYNC. That is, the control signal generator CSGP generates the source control signal SDS and the gate control signal GDS based on the external synchronization signal OSYNC from the third time point Tcd when the external synchronization signal OSYNC is synchronized with the corrected synchronization signal CSYNC after the external synchronization signal OSYNC is restored to the normal state.

Through the present disclosure, when the external synchronization signal OSYNC is provided in the abnormal state, the controller CP drives the display panel DP based on the horizontal synchronization signal ISYNC_a. Even if the external synchronization signal OSYNC is restored to the normal state, when the horizontal synchronization signal ISYNC_a, which is the driving reference of the display panel DP in the abnormal state of the external synchronization signal OSYNC, is not synchronized with the external synchronization signal OSYNC, the controller CP may drive the display panel DP based on the corrected synchronization signal CSYNC. Thereafter, when the external synchronization signal OSYNC is synchronized with the corrected synchronization signal CSYNC, the controller CP may drive the display panel DP based on the external synchronization signal OSYNC.

When the external synchronization signal OSYNC is restored to its normal state, and when the controller CP drives the display panel DP based on the external synchronization signal OSYNC in a state in which the external synchronization signal OSYNC is not synchronized with the horizontal synchronization signal ISYNC_a, which is the driving reference of the display panel DP in the abnormal state of the external synchronization signal OSYNC, reliability of display quality of the display panel DP may be deteriorated. In detail, since the display panel DP operated in response to the emission control signals EMS1 to EMSn (refer to FIG. 3) generated based on the horizontal synchronization signal ISYNC_a is operated in response to the emission control signals EMS1 to EMSn generated based on the external synchronization signal OSYNC that is not synchronized, the luminance of the display panel DP may be reduced. In addition, the display panel DP which is operated in response to the data signal DS and the scan signals SS1 to SSn (refer to FIG. 3) generated based on the horizontal synchronization signal ISYNC_a is operated in response to the data signal DS and the scan signals SS1 to SSn generated based on the non-synchronized external synchronization signal OSYNC. Accordingly, since the data signal DS is not sufficiently applied to the pixels when the horizontal synchronization signal ISYNC_a is changed to the external synchronization signal OSYNC, the reliability of the display quality of the image IM (refer to FIG. 1) displayed on the display panel DP may be deteriorated.

In contrast, in the present disclosure, when the external synchronization signal OSYNC is not synchronized with the corrected synchronization signal CSYNC, the display panel DP is driven based on the corrected synchronization signal CSYNC. According to the present disclosure, since the display panel DP is driven with the external synchronization signal OSYNC only when the external synchronization signal OSYNC is synchronized with the corrected synchronization signal CSYNC, the above problems may not occur and the display panel DP may improve the reliability of display quality.

The method of driving the display device DD according to the present disclosure may include determining whether the external synchronization signal OSYNC provided to the panel driving block PDB (refer to FIG. 3) is in the normal state. In detail, the method of driving the display device DD may include determining whether the external synchronization signal OSYNC provided to the controller CP through the error determination circuit EJP is in the normal state.

The method of driving the display device DD may include generating the control signal CS based on the horizontal synchronization signal ISYNC_a when it is determined that the external synchronization signal OSYNC is in the abnormal state. In detail, the method of driving the display device DD, when it is determined that the external synchronization signal OSYNC is in the abnormal state through the error determination circuit EJP, may include generating the control signal CS based on the horizontal synchronization signal ISYNC_a generated through the synchronization signal generator SYCG. In addition, the present disclosure is not limited thereto, and in operation of generating the control signal CS, the present disclosure may generate the control signal CS based on the horizontal synchronization signal ISYNC_a and the vertical synchronization signal ISYNC_b (refer to FIG. 5B).

The method of driving the display device DD may include generating the control signal CS based on the external synchronization signal OSYNC when it is determined that the external synchronization signal OSYNC is in the normal state. In detail, the method of driving the display device DD may include generating the control signal CS based on the external synchronization signal OSYNC when it is determined that the external synchronization signal OSYNC is in the normal state through the error determination circuit EJP.

The method of driving the display device DD may include generating the corrected synchronization signal CSYNC by correcting the horizontal synchronization signal ISYNC_a when the external synchronization signal OSYNC is restored from the abnormal state to the normal state. In detail, the method of driving the display device DD, when it is determined that the external synchronization signal OSYNC is restored from the abnormal state to the normal state through the error determination circuit EJP, may include generating the corrected synchronization signal CSYNC by correcting the horizontal synchronization signal ISYNC_a.

The method of driving the display device DD may include determining whether the corrected synchronization signal CSYNC is synchronized with the external synchronization signal OSYNC. In detail, the method of driving the display device DD may determine whether the corrected synchronization signal CSYNC is synchronized with the external synchronization signal OSYNC through the synchronization determination circuit SYCJ. When it is determined that the corrected synchronization signal CSYNC is synchronized with the external synchronization signal OSYNC, the display device DD generates the control signal CS based on the external synchronization signal OSYNC. When it is determined that the corrected synchronization signal CSYNC is not synchronized with the external synchronization signal OSYNC, the display device DD generates the control signal CS based on the corrected synchronization signal CSYNC.

According to the present disclosure, when the external synchronization signal OSYNC is not synchronized with the corrected synchronization signal CSYNC, the display panel DP is driven by the corrected synchronization signal CSYNC. According to the present disclosure, since the display panel DP is driven by the external synchronization signal OSYNC only when the external synchronization signal OSYNC is synchronized with the corrected synchronization signal CSYNC, the display panel DP may improve the reliability of display quality.

When describing FIGS. 6B and 7C, the same reference numerals are assigned to the same components and signals as those described with reference to FIGS. 6A and 7A, and additional descriptions thereof will be omitted to avoid redundancy.

Figure 7C:
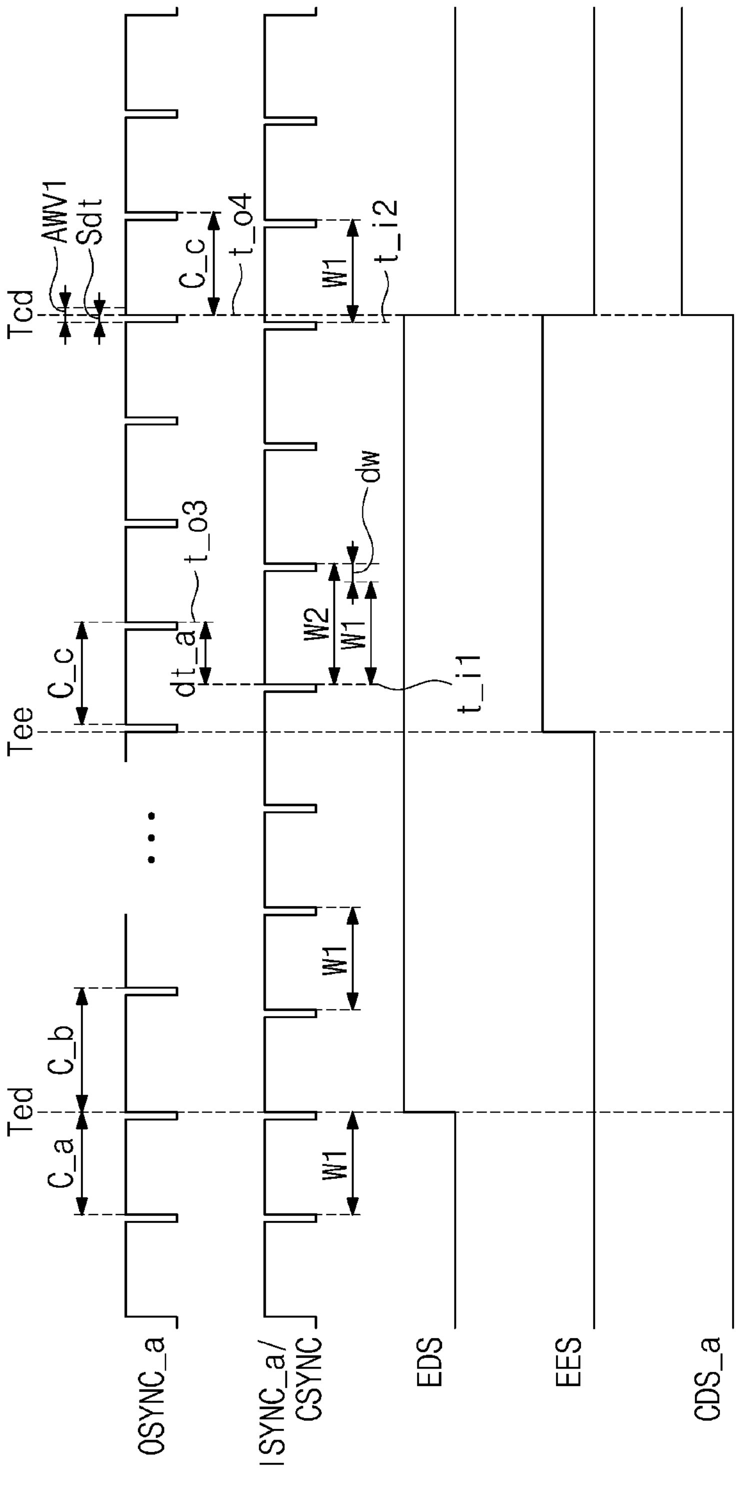

Referring to FIGS. 6B and 7C, as an example of the present disclosure, a synchronization determination circuit SYCJ_a may further receive a preset first allowable value AWV1. When a difference dt_a between the start time point t_o3 of the active section of an external synchronization signal OSYNC_a and the start time point t_i1 of the active section of the corrected synchronization signal CSYNC is less than the first allowable value AWV1, the synchronization determination circuit SYCJ_a may generate a timing signal CDS_a. As an example of the present disclosure, a difference Sdt between a start time point t_o4 of the active section of the external synchronization signal OSYNC_a and the start time point t_i2 of the active section of the corrected synchronization signal CSYNC at the third time point Tcd is less than the first allowable value AWV1, the synchronization determination circuit SYCJ_a may determine that the external synchronization signal OSYNC_a is synchronized with the corrected synchronization signal CSYNC and may generate the timing signal CDS_a. As an example of the present disclosure, the first allowable value AWV1 may be set to a value in which a user using the display device DD does not feel a change in the display quality of the image IM (refer to FIG. 1). Through this, it is possible to increase the reliability of the operation of the synchronization determination circuit SYCJ_a, and when the external synchronization signal OSYNC_a is provided in the normal state, reliability of display quality may be improved by increasing the time for driving the display panel DP (refer to FIG. 2) with the control signal CS generated based on the external synchronization signal OSYNC_a.

As an example of the present disclosure, the error determination circuit EJP may further receive a preset second allowable value AWV2. The second allowable value AWV2 may indicate a condition set for the error determination circuit EJP to determine whether the external synchronization signal OSYNC_a is restored from the abnormal state to the normal state. When the second allowable value AWV2 is provided, and when the plurality of third periods C_c following the second period C_b of the external synchronization signal OSYNC_a are the same as the first period C_a, the error determination circuit EJP may generate the error end signal EES.

When describing FIGS. 6A and 7D, the same reference numerals are assigned to the same components and signals as those described with reference to FIGS. 6A and 7A, and additional descriptions thereof will be omitted to avoid redundancy.

Figure 7D:
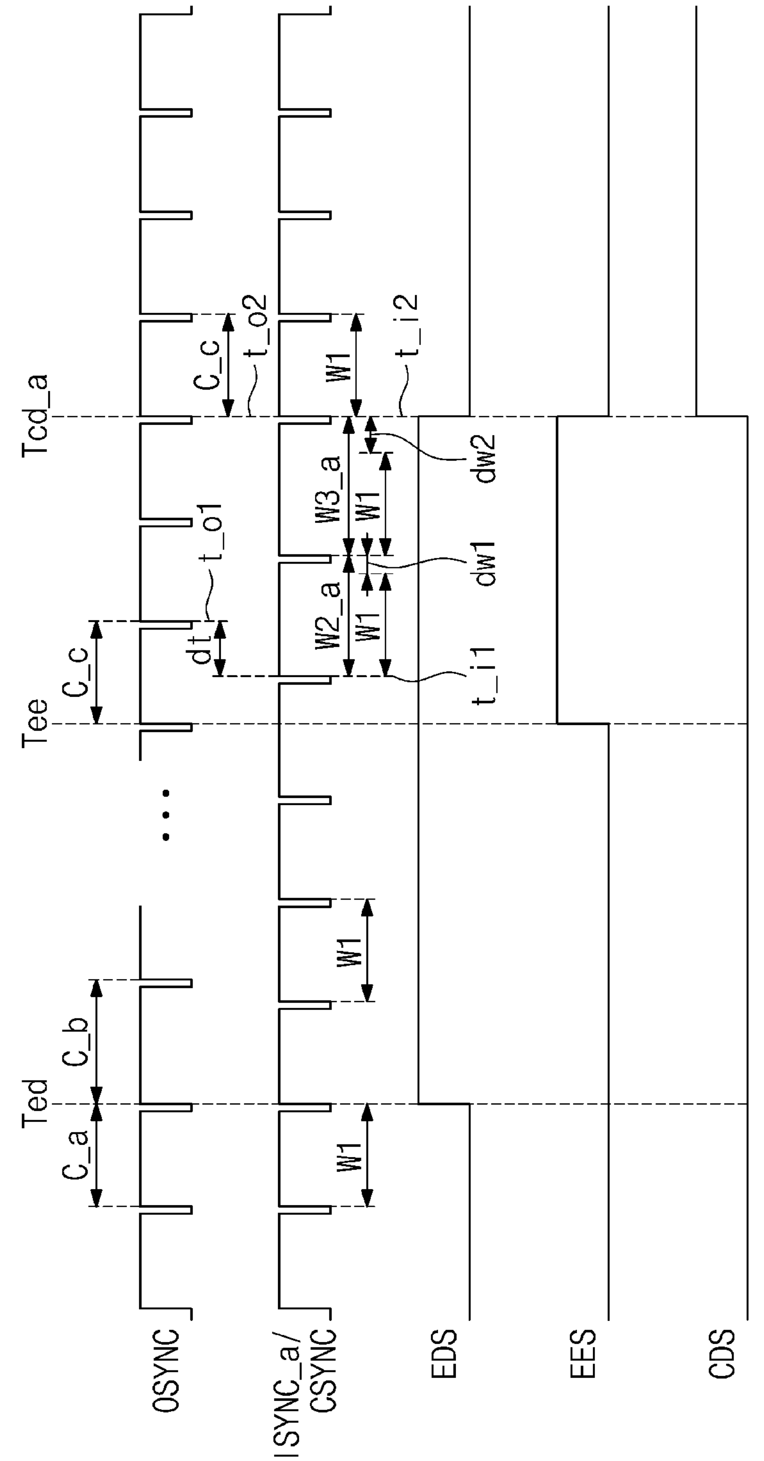

Referring to FIGS. 6A and 7D, as an example of the present disclosure, the corrector CPT may generate the corrected synchronization signal CSYNC such that respective periods of the corrected synchronization signal CSYNC are different from one another. As an example of the present disclosure, the corrected synchronization signal CSYNC includes a first correction period W2_*a* and a second correction period W3_*a*. The first correction period W2_*a* may be less than the second correction period W3_*a* which is a period subsequent to the first correction period W2_*a*. As an example of the present disclosure, a difference between the first correction period W2_*a* and the horizontal period W1 may be referred to as a third difference dw1. A difference between the second correction period W3_*a* and the horizontal period W1 may be referred to as a fourth difference dw2. The first difference dt between the start time t_o1 of the active section of the external synchronization signal OSYNC and the start time t_i1 of the active section of the corrected synchronization signal CSYNC may gradually decrease due to the third difference dw1 and the fourth difference dw2. As an example of the present disclosure, when the corrected synchronization signals CSYNC include the first and second correction periods W2_*a* and W3_*a*, a time point Tcd_a at which the external synchronization signal OSYNC is synchronized with the corrected synchronization signal CSYNC may precede the third time point Tcd (refer to FIG. 7A) at which the external synchronization signal OSYNC is synchronized with the corrected synchronization signal CSYNC in the embodiment when the corrected synchronization signals CSYNC include only the first correction period W2 (refer to FIG. 7A). However, the present disclosure is not limited thereto. Alternatively, the corrector CPT may generate the corrected synchronization signal CSYNC such that respective periods of the corrected synchronization signal CSYNC gradually increase.

Figure 8:
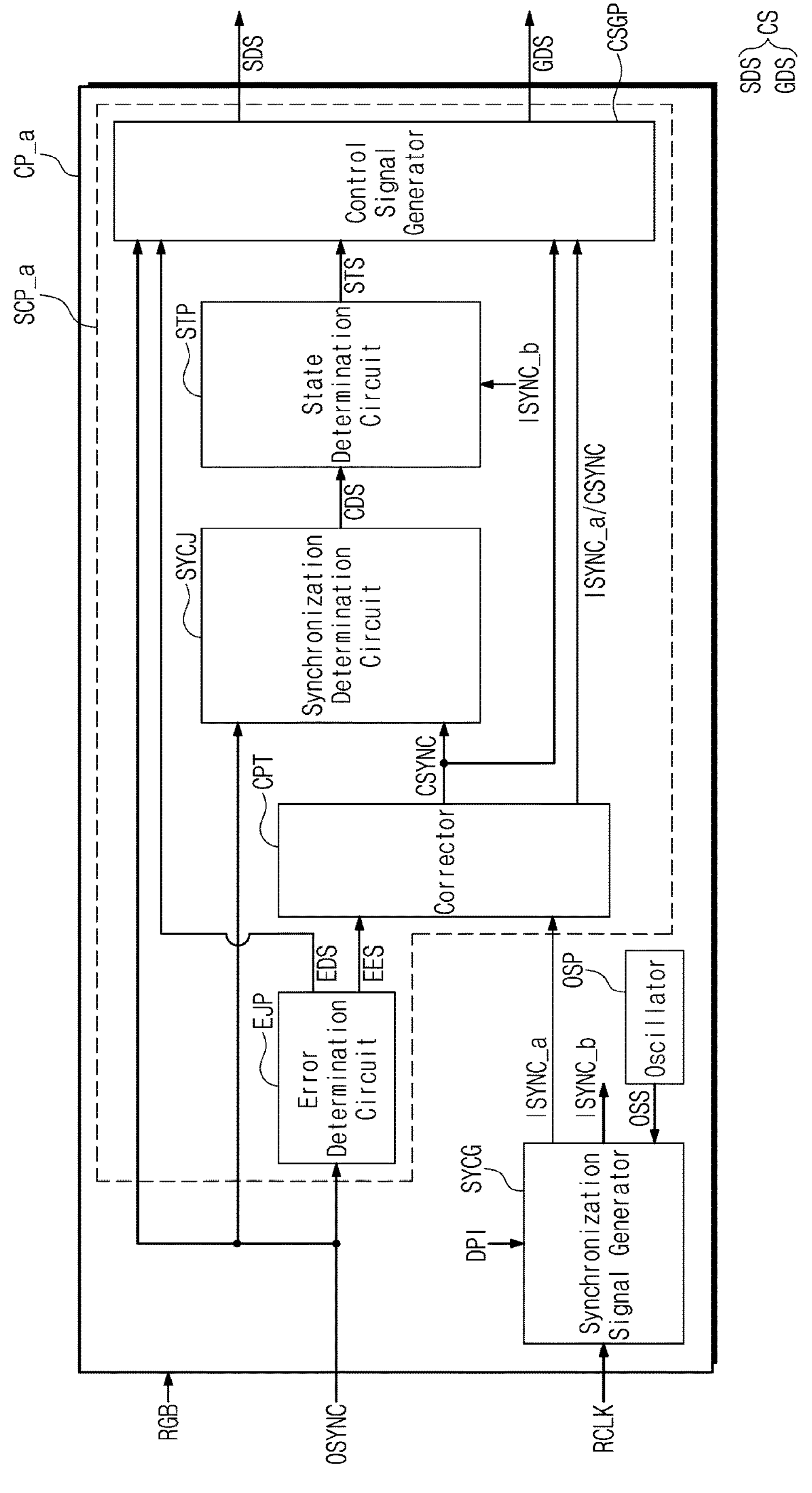
FIG. 8 is a block diagram illustrating a configuration of a controller, according to an embodiment of the present disclosure.

FIG. 8 is a block diagram illustrating a configuration of a controller, according to an embodiment of the present disclosure. FIGS. 9A to 10B are waveform diagrams for describing an operation of a signal converter, according to an embodiment of the present disclosure. Hereinafter, components and signals that are the same as the components and signals described with reference to FIGS. 6 to 7C are marked by the same reference signs, and thus, additional description will be omitted to avoid redundancy.

Figure 9A:
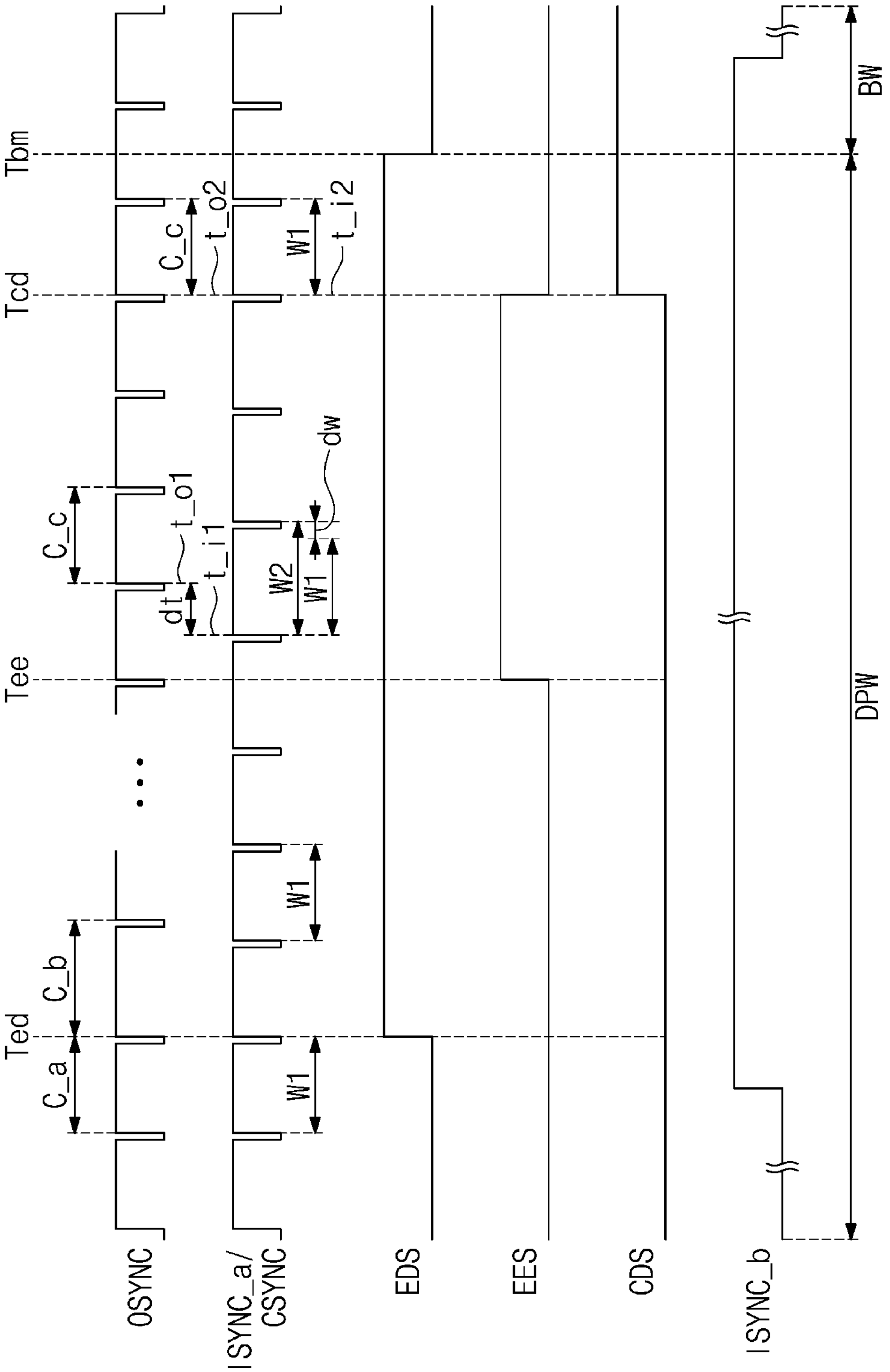

Referring to FIGS. 8 and 9A, a controller CP_a includes the synchronization signal generator SYCG, the oscillator OSP, and a signal converter SCP_a. The signal converter SCP_a includes the error determination circuit EJP, the corrector CPT, the synchronization determination circuit SYCJ, a state determination circuit STP, and the control signal generator CSGP.

The state determination circuit STP receives the timing signal CDS from the synchronization determination circuit SYCJ. The state determination circuit STP receives the vertical synchronization signal ISYNC_b from the synchronization signal generator SYCG. The state determination circuit STP generates a state signal STS for controlling the operation of the control signal generator CSGP based on the timing signal CDS and the vertical synchronization signal ISYNC_b. As an example of the present disclosure, a driving frame of the display panel DP (refer to FIG. 2) includes a display section DPW in which the image IM (refer to FIG. 1) is displayed on the display panel DP and a blank section BW in which the image IM is not displayed on the display panel DP. The vertical synchronization signal ISYNC_b includes information on the display section DPW and information on the blank section BW. As an example of the present disclosure, the blank section BW may include a first blank section preceding the display section DPW in time and a second blank section trailing the display section DPW in time.

The state determination circuit STP may receive information indicating that the external synchronization signal OSYNC is synchronized with the corrected synchronization signal CSYNC from the timing signal CDS. The state determination circuit STP may receive information on the blank section BW from the vertical synchronization signal ISYNC_b. As an example of the present disclosure, the state determination circuit STP may generate the state signal STS when the external synchronization signal OSYNC is synchronized with the corrected synchronization signal CSYNC and when the vertical synchronization signal ISYNC_b is in the blank section BW. The state determination circuit STP may not generate the state signal STS when only the external synchronization signal OSYNC is synchronized with the corrected synchronization signal CSYNC and the vertical synchronization signal ISYNC_b is in the blank section BW. In addition, even when the external synchronization signal OSYNC and the correction synchronization signal CSYNC are not synchronized and the vertical synchronization signal ISYNC_b is not in the blank section BW, the state determination unit STP may not generate the state signal STS.

As an example of the present disclosure, the state determination circuit STP receives the timing signal CDS from the synchronization determination circuit SYCJ at the third time point Tcd. However, since information on the blank section BW is not included in the vertical synchronization signal ISYNC_b at the third time Tcd, the state determination circuit STP does not generate the state signal STS. The state determination circuit STP generates the state signal STS at a time point Tbm (hereinafter, referred to as a fourth time point) at which information on the blank section BW is included in the vertical synchronization signal ISYNC_b.

Figure 9B:
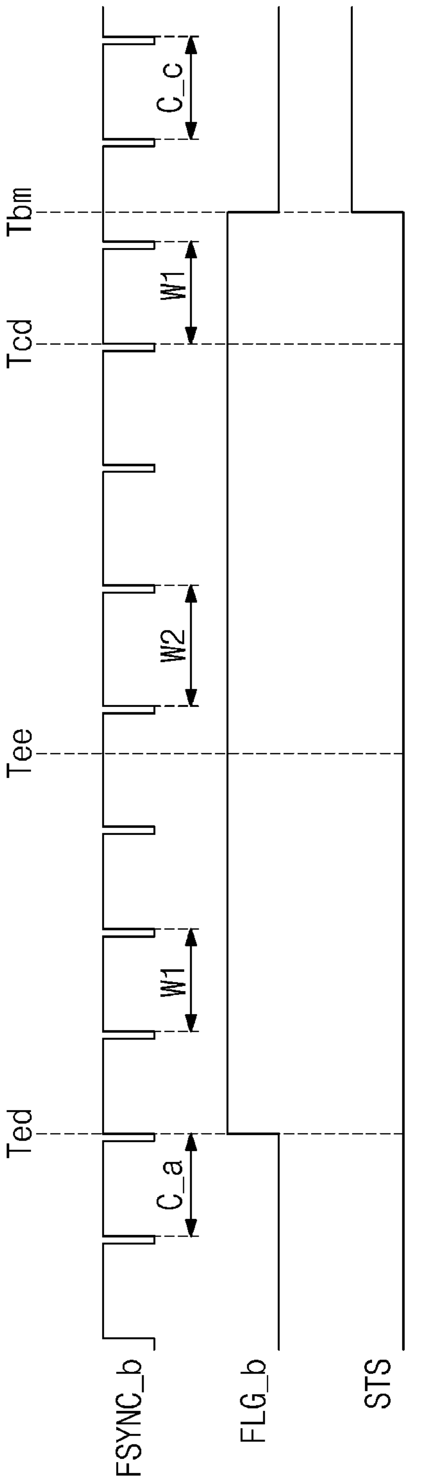

FIG. 9B illustrates a second final synchronization signal FSYNC_b, which is a synchronization signal serving as a reference for generating the source control signal SDS and the gate control signal GDS in the control signal generator CSGP, and a second flag signal FLG_b for indicating an operation state of the controller CP_a.

As an example of the present disclosure, the second final synchronization signal FSYNC_b is generated based on the external synchronization signal OSYNC before the first time point Ted and has the first period C_a. The second final synchronization signal FSYNC_b is generated based on the horizontal synchronization signal ISYNC_a from the first time point Ted to the second time point Tee, and has the horizontal period W1. The second final synchronization signal FSYNC_b is generated based on the corrected synchronization signal CSYNC from the second time point Tee to the third time point Tcd, and has the correction period W2. The second final synchronization signal FSYNC_b is generated based on the horizontal synchronization signal ISYNC_a from the third time point Tcd to the fourth time point Tbm, and has the horizontal period W1. The second final synchronization signal FSYNC_b is generated based on the external synchronization signal OSYNC again after the fourth time point Tbm and has the third period C_c.

As an example of the present disclosure, when the controller CP_a controls the driving of the display panel DP with the control signal CS (refer to FIG. 8) generated based on the external synchronization signal OSYNC, the second flag signal FLG_b includes a section having a first state (e.g., a low level). When the controller CP_a controls the driving of the display panel DP with the control signal CS generated based on the horizontal synchronization signal ISYNC_a or the corrected synchronization signal CSYNC, the second flag signal FLG_b may include a section having a second state (e.g., a high level). The state of the second flag signal FLG_b is determined according to which synchronization signal is used for the controller CP. The second flag signal FLG_b may have the first state which is the high level and the second state which is the low level.

As an example of the present disclosure, the second flag signal FLG_b may be generated by the control signal generator CSGP (refer to FIG. 8). When the control signal generator CSGP receives the error detection signal EDS (refer to FIG. 8), the control signal generator CSGP may generate the second flag signal FLG_b having the second state, and when the control signal generator CSGP receives the state signal STS (refer to FIG. 8), the control signal generator CSGP may generate the second flag signal FLG_b having the first state.

The control signal generator CSGP receives the external synchronization signal OSYNC from the external input device OID (refer to FIG. 4) and receives the horizontal synchronization signal ISYNC_a from the corrector CPT. As an example, the control signal generator CSGP generates the source control signal SDS and the gate control signal GDS based on the external synchronization signal OSYNC before the first time point Ted.

When it is determined that the external synchronization signal OSYNC is in the abnormal state, the control signal generator CSGP may receive the error detection signal EDS from the error determination circuit EJP. When the error detection signal EDS is received, the control signal generator CSGP generates the source control signal SDS and the gate control signal GDS based on the horizontal synchronization signal ISYNC_a. As an example of the present disclosure, the control signal generator CSGP may generate the source control signal SDS and the gate control signal GDS based on the horizontal synchronization signal ISYNC_a from the first time point Ted to the second time point Tee.

When it is determined that the external synchronization signal OSYNC is restored from the abnormal state to the normal state, the control signal generator CSGP receives the corrected synchronization signal CSYNC from the corrector CPT. As an example of the present disclosure, the control signal generator CSGP generates the source control signal SDS and the gate control signal GDS based on the corrected synchronization signal CSYNC.

Even if when it is determined that the external synchronization signal OSYNC is synchronized with the corrected synchronization signal CSYNC, when the synchronized third time point Tcd is not included in the blank section BW, the control signal generator CSGP does not receive the state signal STS from the state determination circuit STP. Accordingly, the control signal generator CSGP generates the source control signal SDS and the gate control signal GDS based on the corrected synchronization signal CSYNC.

At the fourth time point Tbm in which the external synchronization signal OSYNC is synchronized with the corrected synchronization signal CSYNC, and the synchronized third time point Tcd is included in the blank section BW, the control signal generator CSGP receives the state signal STS from the state determination circuit STP. When the state signal STS is received, the control signal generator CSGP may generate the source control signal SDS and the gate control signal GDS based on the external synchronization signal OSYNC.

Figure 10A:
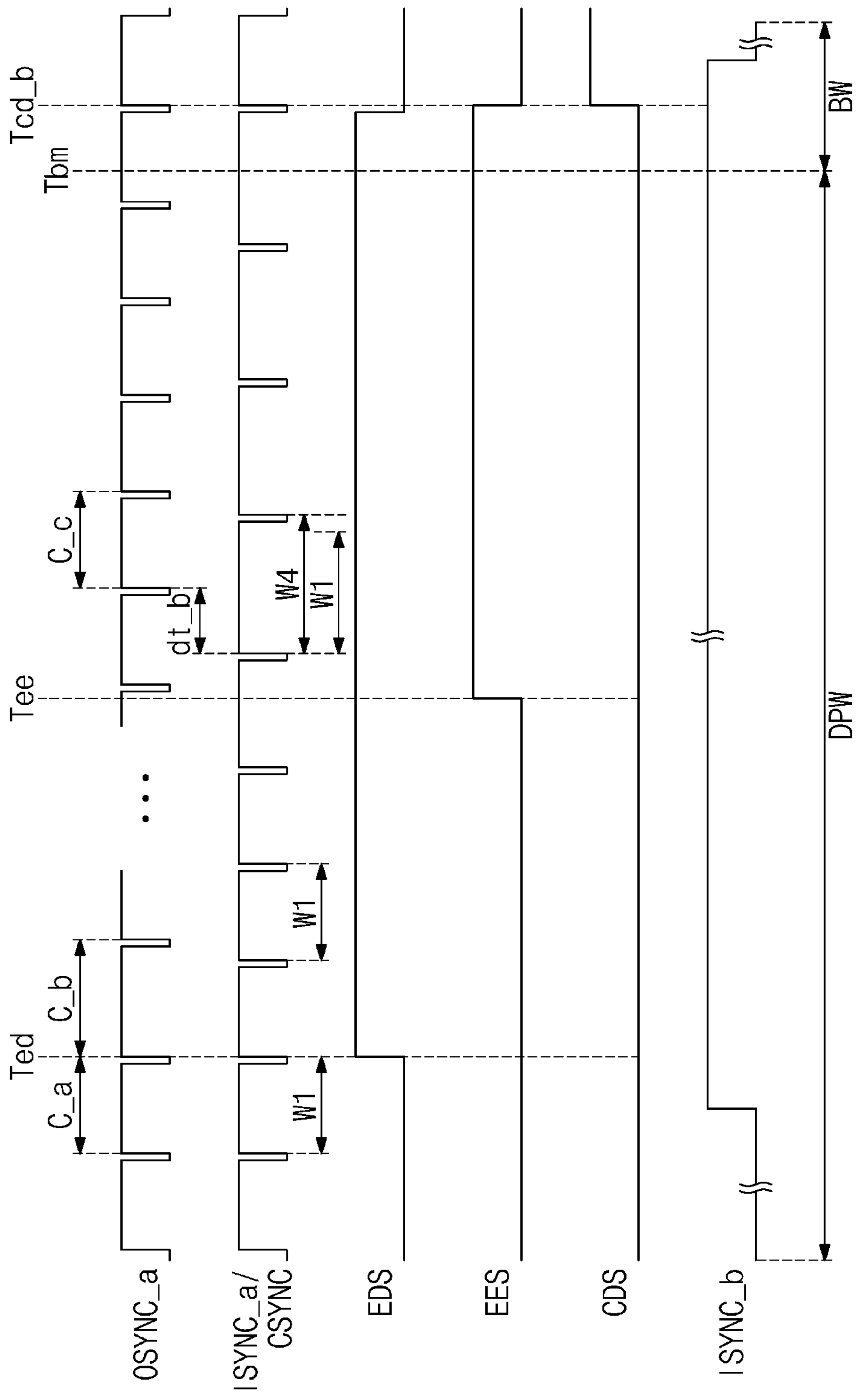

Referring to FIGS. 8 and 10A, the state determination circuit STP receives information on the blank section BW from the vertical synchronization signal ISYNC_b at the fourth time point Tbm. At a time point at which the timing signal CDS is received from the synchronization determination circuit SYCJ (Tcd_b, hereinafter referred to as a fifth time point) after the fourth time point Tbm, the state determination circuit STP generates the state signal STS.

Figure 10B:
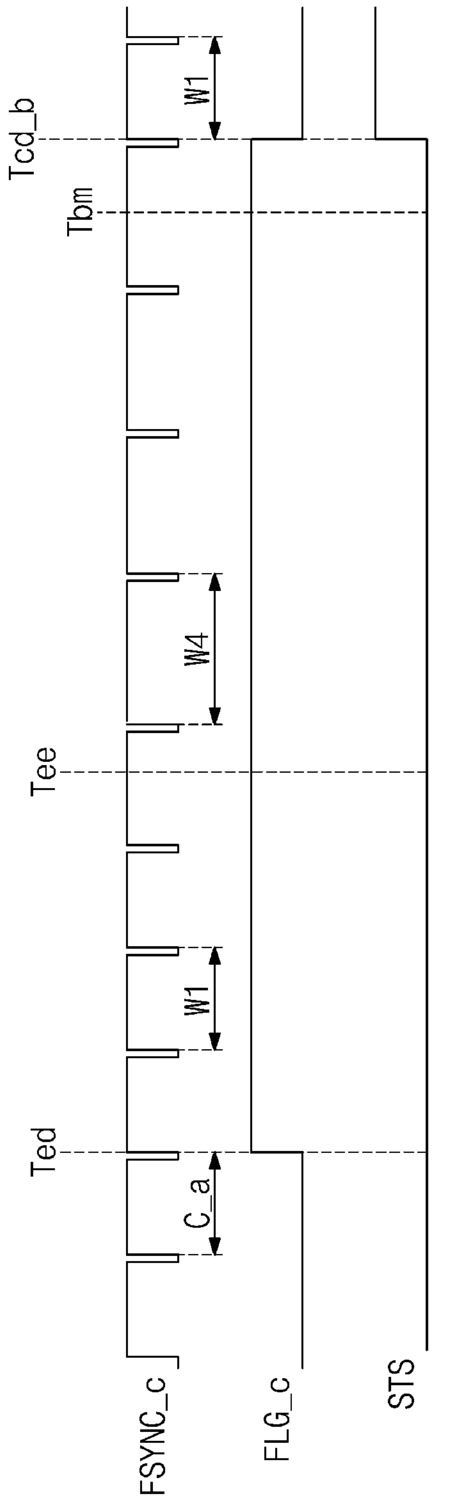

FIG. 10B illustrates a third final synchronization signal FSYNC_c, which is a synchronization signal serving as a reference for generating the source control signal SDS and the gate control signal GDS in the control signal generator CSGP, and a third flag signal FLG_c for indicating an operation state of the controller CP_a.

As an example of the present disclosure, the third final synchronization signal FSYNC_c is generated based on the external synchronization signal OSYNC before the first time point Ted and has the first period C_a. The third final synchronization signal FSYNC_c is generated based on the horizontal synchronization signal ISYNC_a after the first time Ted and before the second time Tee, and has the horizontal period W1. The third final synchronization signal FSYNC_c is generated based on the corrected synchronization signal CSYNC after the second time Tee and before the fifth time point Tcd_b, and has the correction period W4. The third final synchronization signal FSYNC_c is generated based on the external synchronization signal OSYNC again after the fifth time point Tcd_b and has the third period C_c.

As an example of the present disclosure, when the controller CP_a controls the driving of the display panel DP with the control signal CS (refer to FIG. 8) generated based on the external synchronization signal OSYNC, the third flag signal FLG_c includes a section having a first state (e.g., a low level). When the controller CP_a controls the driving of the display panel DP with the control signal CS generated based on the horizontal synchronization signal ISYNC_a or the corrected synchronization signal CSYNC, the third flag signal FLG_c may include a section having a second state (e.g., a high level). The state of the third flag signal FLG_c is determined according to which synchronization signal is used for the controller CP_a. The third flag signal FLG_c may have the first state which is the high level and the second state which is the low level.

The method of driving the display device DD may include determining whether a timing at which the corrected synchronization signal CSYNC and the external synchronization signal OSYNC are synchronized is included in the blank section BW.

As an example of the present disclosure, when a signal change process of changing a signal referenced to generate the control signal CS (refer to FIG. 8) for controlling driving of the display panel DP from the corrected synchronization signal CSYNC to the external synchronization signal OSYNC is performed in the blank section BW in which the image IM is not displayed on the display panel DP, it is possible to prevent deterioration of the display quality of the display panel DP that may occur in the process of changing the referenced signal.

According to an embodiment of the present disclosure, it is possible to control the timing of an image displayed on the display panel, thereby improving the reliability of the display quality of the display panel, regardless of whether the external synchronization signal provided from the outside to the display device is in a normal state. In detail, when an external synchronization signal is abnormally provided, the timing of the image displayed on the display panel may be controlled by the internal synchronization signal generated by the display device, and when the external synchronization signal is restored from an abnormal state to a normal state and provided, the timing of the image displayed on the display panel may be controlled by the external synchronization signal from when the internal synchronization signal and the external synchronization signal are synchronized. In addition, the present disclosure may generate a corrected synchronization signal obtained by correcting an internal synchronization signal for synchronization of the internal synchronization signal and an external synchronization signal.

As described above, embodiments are disclosed in drawings and specifications. Specific terms are used herein, but are only used for the purpose of describing the present disclosure, and are not used to limit the meaning or the scope of the present disclosure described in claims. Therefore, it may be understood that various modifications and other equivalent embodiments are possible from this point one of ordinary skill in the art. The technical protection scope of the present disclosure will be defined by the technical spirit of the appended claims.

What is claimed is:

1. A display device comprising:

a display panel displaying an image;

a controller receiving an image signal and an external synchronization signal, determining whether the external synchronization signal is in a normal state, and generating a control signal;

a driver generating a driving signal in response the control signal and providing the driving signal to the display panel, wherein the controller comprises:

a synchronization signal generator generating an internal synchronization signal based on a reference clock signal;

a corrector correcting the internal synchronization signal to generate a corrected synchronization signal when it is determined that the external synchronization signal is restored from an abnormal state to the normal state; and a control signal generator generating the control signal, and wherein the control signal generator receives the external synchronization signal, the internal synchronization signal, and the corrected synchronization signal, and generates the control signal based on the external synchronization signal when the external synchronization signal is synchronized with the corrected synchronization signal, generates the control signal based on the internal synchronization signal when the external synchronization signal is in the abnormal state, and generates the control signal based on the corrected synchronization signal when the external synchronization signal is not synchronized with the corrected synchronization signal.

2. The display device of claim 1, wherein the controller further includes a synchronization determination circuit determining whether the external synchronization signal is synchronized with the corrected synchronization signal.

3. The display device of claim 2, wherein the synchronization determination circuit generates a timing signal when the external synchronization signal is synchronized with the corrected synchronization signal, and wherein the control signal generator generates the control signal based on the external synchronization signal in response to the timing signal.

4. The display device of claim 3, wherein the synchronization determination circuit receives a preset allowable value and generates the timing signal when a difference between a start time of an active section of the external synchronization signal and a start time of an active section of the corrected synchronization signal is less than the preset allowable value.

5. The display device of claim 3, wherein the internal synchronization signal includes a vertical synchronization signal and a horizontal synchronization signal, wherein the corrected synchronization signal is a signal generated by correcting the horizontal synchronization signal, and wherein the controller further includes a state determination circuit generating a state signal for controlling an operation of the control signal generator based on the timing signal and the vertical synchronization signal.

6. The display device of claim 5, wherein the vertical synchronization signal includes information on a display section in which the image is displayed on the display panel and a blank section in which the image is not displayed on the display panel, and wherein the state determination circuit generates the state signal when the external synchronization signal is synchronized with the corrected synchronization signal and when the vertical synchronization signal is in the blank section.

7. The display device of claim 1, wherein one period of the corrected synchronization signal is different from one period of the internal synchronization signal.

8. The display device of claim 7, wherein one period of the corrected synchronization signal is greater than one period of the internal synchronization signal.

9. The display device of claim 8, wherein a first period of the corrected synchronization signal is less than a second period that is a subsequent period of the first period of the corrected synchronization signal.

10. The display device of claim 1, wherein the controller further includes an error determination circuit determining whether the external synchronization signal is in the abnormal state, wherein the error determination circuit provides an error detection signal to the control signal generator when it is determined that the external synchronization signal is in the abnormal state, and wherein the control signal generator generates the control signal based on the internal synchronization signal when the error detection signal is received.

11. The display device of claim 10, wherein the error determination circuit generates an error end signal when the external synchronization signal is restored from the abnormal state to the normal state and provides the error end signal to the corrector, and wherein the corrector generates the corrected synchronization signal by correcting the internal synchronization signal when the error end signal is received.

12. The display device of claim 11, wherein the error determination circuit generates the error detection signal when the external synchronization signal is in the abnormal state and a first period of the external synchronization signal is different from a second period of the external synchronization signal that is a subsequent to the first period.

13. The display device of claim 12, wherein the error determination circuit generates the error end signal when the external synchronization signal is restored from the abnormal state to the normal state and a third period of the external synchronization signal that is a subsequent to the second period of the external synchronization signal is the same as the first period.

14. The display device of claim 1, wherein the controller further includes an oscillator generating an oscillation signal having a predetermined frequency, and wherein the synchronization signal generator generates the internal synchronization signal based on the reference clock signal and the oscillation signal.

15. The display device of claim 1, wherein the driver includes:

a source driver receiving the image data from the controller and providing a data signal for displaying the image on the display panel; and a gate driver providing a scan signal to the display panel, and wherein the control signal includes a first control signal for controlling the source driver and a second control signal for controlling the gate driver.

16. A method of driving a display device including a display panel displaying an image, a controller receiving an image signal and generating a control signal, and a driver generating a driving signal in response the control signal and provide the driving signal to the display panel, the method comprising:

determining whether an external synchronization signal provided to the controller is in a normal state;

generating the control signal based on an internal synchronization signal generated based on a reference clock signal when it is determined that the external synchronization signal is in an abnormal state;

generating a corrected synchronization signal by correcting the internal synchronization signal when the external synchronization signal is restored from the abnormal state to the normal state;

determining whether the corrected synchronization signal is synchronized with the external synchronization signal;

generating the control signal based on the corrected synchronization signal when the corrected synchronization signal is not synchronized with the external synchronization signal; and generating the control signal based on the external synchronization signal when the corrected synchronization signal is synchronized with the external synchronization signal.

17. The method of claim 16, further comprising:

generating the control signal based on the external synchronization signal when it is determined that the external synchronization signal is in the normal state.

18. The method of claim 16, wherein a driving frame of the display panel includes a display section in which the image is displayed on the display panel and a blank section in which the image is not displayed on the display panel, the generating the control signal comprises:

determining whether a timing at which the corrected synchronization signal is synchronized with the external synchronization signal is included in the blank section; and generating the control signal based on the external synchronization signal when the synchronized timing is included in the blank section.

19. The method of claim 18, wherein the generating the control signal further comprises:

generating the control signal based on the external synchronization signal from a start time of the blank section when the synchronized timing is not included in the blank section.

* * * * *